US006438437B1

(12) United States Patent
Yamaoka et al.

(10) Patent No.: US 6,438,437 B1
(45) Date of Patent: Aug. 20, 2002

(54) PARTS CLASSIFICATION UNIT

(75) Inventors: Yoshihisa Yamaoka, Seki; Katsumi Suzumura, Kagamihara, both of (JP)

(73) Assignee: Yamazaki Mazak Kabushiki Kaisha (JP)

( * ) Notice: Subject to any disclaimer, the term of this patent is extended or adjusted under 35 U.S.C. 154(b) by 0 days.

(21) Appl. No.: 09/470,324

(22) Filed: Dec. 22, 1999

(30) Foreign Application Priority Data

Dec. 25, 1998 (JP) .......................... 10-368361
Dec. 25, 1998 (JP) .......................... 10-368722
Dec. 25, 1998 (JP) .......................... 10-369232

(51) Int. Cl.[7] ............................................. G06F 19/00
(52) U.S. Cl. .................... 700/112; 700/182; 700/192
(58) Field of Search ................................. 700/113, 112, 700/182, 180, 159, 96, 228, 114, 192, 167, 86

(56) References Cited

U.S. PATENT DOCUMENTS

| 4,896,086 A | * | 1/1990 | Miyahara et al. | 198/345.3 |
| 4,998,206 A | | 3/1991 | Jones et al. | 700/96 |
| 5,113,338 A | * | 5/1992 | Seki et al. | 700/180 |
| 5,450,333 A | | 9/1995 | Minami et al. | 700/167 |
| 5,696,687 A | * | 12/1997 | DeMotte et al. | 29/407.1 |
| 5,850,342 A | * | 12/1998 | Nakamura et al. | 198/468.2 |
| 5,997,169 A | * | 12/1999 | Watanabe et al. | 700/115 |
| 6,035,243 A | * | 3/2000 | Galuga et al. | 700/110 |
| 6,047,225 A | * | 4/2000 | Iriguchi et al. | 700/160 |
| 6,311,966 B1 | * | 11/2001 | Morishita et al. | 269/21 |
| 2001/0001841 A1 | * | 5/2001 | Sugiyama et al. | 700/192 |

FOREIGN PATENT DOCUMENTS

| JP | 58199659 | 11/1983 |
| JP | 03205223 | 9/1991 |
| JP | 07124773 | 5/1995 |

OTHER PUBLICATIONS

Copy of EPO Search Report for EPO Patent Application 99 12 5537, No Date.

* cited by examiner

Primary Examiner—Thomas Black
Assistant Examiner—Edward F. Gain, Jr.
(74) Attorney, Agent, or Firm—Richard P. Gilly

(57) ABSTRACT

A parts classification unit 15 displays parts 70 and a palletizing robot 20 so as to compute the absorbing position of the palletizing robot 20 with respect to the parts 70 displayed as part.robot information BRJ by the instruction of an operator. The moving.positioning instruction FRn of the robot 20 between the classification head 5 and the pallet 10 is composed on the basis of the parts.robot information BRJ, sheet nesting information SNJ showing location state of the parts in the classification head and pallet nesting information PNJ showing location state of the parts on the pallet 10. By this structure, the time of machining and classification is made shortened without teaching.

20 Claims, 24 Drawing Sheets

| PARTS NAME | sort3 |
|---|---|
| MATERIAL | SPCC |
| PLATE THICKNESS (mm) | 2.3 |
| PARTS SHAPE AND DIMENSION | |
| WEIGHT(kg) | |

FIG. 21

| MATERIAL | DENSITY (Kg/m³) |
|---|---|
| A L 5052 | 1000 |
| S E C C | 7850 |
| S G | 1520 |
| S P C C | 6500 |
| S U S 304 | 1100 |

~ZMF

FIG. 22

Bm  
Sort3,      x  y  c  b1       Zs, Ia, Bw, Bk  
............,0,0,9.75,0,-15.32,-24.05,0,-345.2,  
       a2    a3    a4  
-348.3,-420.6,-344.1,00000000001100000  
                                              j1  
00,00000000000000000000,000100000001100  
       j2                                          j3  
00000,000000000000000000000  
           j4  
Sort4, ............

| SHEET NO. | PARTS NAME | NUMBER OF ITEM | PALLET NO. |
|---|---|---|---|
| 1 | Sort3 | 5 | 1 |
| | Sort2 | 5 | 1 |
| | Sort6 | 5 | 1 |
| | Sort9 | 5 | 1 |
| | Sort4 | 5 | 1 |

FIG. 28

SNJ {
  P1 Sample Sn
    Bm  x  y  c  b1  b2  b3  b4  a1
  Sort3, 319, 275.5, 189.75, 0, -15.32, -24.05, 0, -345.2,
    a2  a3  a4
  -348.3, -420.6, -344.1, 0000000000110000000, 000000000
                                            j1           j2

0000000000, 0001000000110000000, 00000000000000000000
                          j3           j4

Sort3, 464, 275.5, 9.75, 0, -15.32, -24.05, 0, -345.2,

-348.3, -420.6, -344.1, 0000000000110000000, 000000000

0000000000, 0001000000110000000, 00000000000000000000

Sort3, ..............................

.................

Sort2, 1087.5, 275.5, 341.809, ...........................

............................
}

SNJ {
  P2 Sample Sn

Sort10, .................................

..................
}

SNJ {
  P3 Sample Sn

Sort22, ..................................

SPR

P 1

FR1 {
PIC1 X230.0 Y487.5 Z-70.0 W189.75 G-345.2 H-34
8.3 I-420.6 J-344.1 K0.0 L-15.32 M-24.05 N0.0
P00c00 Q00000 R00c08 S00000 T0
ULD1 X439.5 Y5091.0 Z-350.0 W189.75 G-345.2 H-34
8.3 I-420.6 J-344.1 K0.0 L-15.32 M-24.05 N0.0
P00c00 Q00000 R00c08 S00000 T0
}

FR2 {
PIC2 X375.0 Y487.5 Z-70.0 W9.75 G-345.2 H-34
8.3 I-420.6 J-344.1 K0.0 L-15.32 M-24.05 N0.0
P00c00 Q00000 R00c08 S00000 T0
ULD2 X439.5 Y5091.0 Z-350.0 W189.75 G-345.2 H-34
8.3 I-420.6 J-344.1 K0.0 L-15.32 M-24.05 N0.0
P00c00 Q00000 R00c08 S00000T0
}

FR6 {
PIC6 X998.5 Y487.5 Z-70.0 W341.809 ·············
················
ULD6 X570.0 Y5004.0 Z-350.0 W161.809 ············
················
}

PARTS CLASSIFICATION UNIT

BACKGROUND OF THE INVENTION

This invention relates to a parts classification unit capable of absorbing, carrying and classifying parts made by machining a sheet workpiece in a laser beam machining equipment from a classification head to a pallet.

In a conventional laser beam machining equipment, an absorption carriage unit in which the parts made by cutting and machining a sheet workpiece are absorbed and carried, making use of vacuum pads is used. The cut machined sheet workpiece is once carried to the classification head, and the respective parts included in the sheet workpiece on the classification head are classified to a predetermined pallet, using the absorption carrier unit. Usually, the control information concerning the operation of the positioning of the absorption carrier unit at the time of absorbing and carrying is set by teaching.

But, since it is necessary to execute teaching in the above-mentioned conventional absorption carrier unit, the time necessary for classifying the parts is longer as much as the time for teaching.

Besides, in order to classify various shapes of parts on the pallet, it is necessary to determine the classification position for each shape of the parts on the pallet. In a conventional method, the classification position of each shape of the parts on the pallet is determined by actually locating these parts with hands, then this hands operation takes much time and much labor.

Besides, teaching is necessary every each parts of all of the parts concerning a plurality of parts included in one sheet workpiece loaded on the classification head even if these parts are the same shape of the parts, so much time is necessary.

Then, taking the above-mentioned circumstances into consideration, the object of the present invention is to provide a parts classification unit capable of extremely shortening the machining.classification operation time without teaching.

Preferably, adding to the above-mentioned object, the object of the present invention is to provide a parts classification unit capable of extremely shortening the classification operation time without locating actual parts on the pallet with hands, that is, without much labor.

Besides, preferably, adding to the above-mentioned objects, the object of the present invention is to provide a parts classification unit capable of executing the operation concerning information setting of a unit in a short time and executing parts classification operation in a short time.

SUMMARY OF THE INVENTION

In order to solve the above-mentioned problems, the 1st proposal of the present invention is a parts classification unit for absorbing parts made by cutting and machining a sheet workpiece through absorbing means and carrying from a first position to a second position and classifying, said parts classification unit comprising:

a shape information storing portion for storing parts shape information of the parts to be classified and absorbing means shape information of said absorbing means;

an image display portion for displaying said parts and said absorbing means on the basis of said parts shape information and said absorbing means shape information stored in said shape information storing portion;

an absorbing position instructing means, capable of instructing absorbing position of said absorbing means with respect to the parts displayed on said image display portion, operable by an operator;

an absorbing means position computing portion for computing the absorbing position of said absorbing means with respect to said parts, instructed by said absorbing position instructing means, as absorbing means position information;

an absorbing means position information storing portion for storing the absorbing means position information computed by said absorbing means position computing portion;

a parts location information storing portion for storing location information in said first position with respect to said parts;

a classification information storing portion for storing classification information in said second position with respect to said parts; and a program composing portion for composing and outputting an absorption carriage program with respect to said parts in such a manner that moving.positioning instruction of said absorbing means from said first position to said second position is composed on the basis of said absorbing means position information stored in said absorbing means position information storing portion, said location information stored in said parts location information storing portion and said classification information stored in said classification information storing portion.

With this structure, the parts and the absorbing means are displayed, the absorbing position of the absorbing means with respect to the parts is instructed by an operator watching this display through the absorbing position instructing means, then the instructed absorbing position is computed as absorbing means position information. That is, since the positioning information of the absorbing means with respect to the parts at the time of actual absorbing and carrying is computed on the basis of the operation by an operator according to the display and the moving.positioning command of the absorbing means is composed on the basis of the positioning information made in this way, it is not necessary to execute teaching using actual parts, different from a conventional way, and machining.classification operation time can be shortened more extremely. Besides, since teaching is not necessary, smooth classification operation is realized without operation interruption for teaching during classification operation.

Besides, the 2nd proposal of the present invention is the parts classification unit as set forth in the 1st proposal wherein a standard position is provided with said absorbing means, and said image display portion displays said parts and said absorbing means, corresponding a gravity position of said parts and said standard position of said absorbing means with each other.

That is, a standard position is provided with the absorbing means. This standard position is the rotational axis CT1 which is the center of the suspension frame 35 suspending the four absorption head aggregates 550 through the arms 47, and is the balance position of the absorbing means on a machine side (gravity or the position near this) in the present embodiment, for instance. And, since the image display portion displays the parts and the absorbing means, corresponding the gravity position of the parts and the standard position of the absorbing means (C-axis in the present embodiment) with each other, the absorbing means can be appropriately located with respect to the parts by designating the absorption position in the state an image is displayed by the image display portion. That is, the location of the actual absorbing means corresponding to this state is the location where the corresponding parts can be supported through the absorbing means with well balance. Since the appropriate designation of absorbing position can be easily executed in the state an image is displayed by the image display portion in the second proposal, the time and labor necessary for the designation of the absorbing position can be saved, and it's very convenient, in addition to the effects of the 1st proposal.

Besides, the 3rd proposal of the present invention is the parts classification unit as set forth in the 1st proposal wherein said image display portion displays said parts and said absorbing means on two-dimensional coordinates corresponding to a level movement direction of said absorbing means.

Then, since the parts and the absorbing means are displayed on the two-dimensional coordinates corresponding to the level movement direction of the absorbing means, the absorbing position of the absorbing means with respect to the parts can be designated by moving on the display by the moving pattern corresponding to the level moving direction of the actual absorbing means, in addition to the 1st proposal. So, an operator can correctly and easily grasp the relative position between the parts and the absorbing means. Then, the designation of the absorbing position can be correctly executed. In the result, designation error of the absorbing position is decreased.

Besides, the 4th proposal of the present invention is the parts classification unit as set forth in the 1st proposal wherein an absorbing force detecting portion for detecting absorbing force by said absorbing means is provided, and an absorbing force judgement output portion for judging and outputting excess or deficiency of absorbing force by said absorbing means on the basis of the absorbing force detected by said absorbing force detecting portion and the weight of parts to be classified is provided.

Then, as to whether or not the absorbing force by the absorbing means is proper when the parts to be classified is absorbed can be checked in advance, in addition to the first proposal since excess or deficiency of the absorbing force by the absorbing means is judged and output when the parts to be classified is absorbed. Accordingly, the trouble at the time of actual absorbing and carrying is prevented. That is, such a trouble that the parts could not be absorbed and brought up because of too small absorbing force or that the parts could be damaged, for instance, when the parts to be absorbed and carried catches the sheet workpiece and are brought up together with the sheet workpiece, without being free from the sheet workpiece because of too big absorbing force, can be prevented.

Besides, the 5th proposal of the present invention is the parts classification unit as set forth in the 4th proposal wherein said absorbing means has an absorption head aggregate comprised of a plurality of absorption heads, an absorption head position relation judgement portion for judging the position relation of each of said absorption heads of said absorbing means with respect to said parts displayed on said image display portion is provided, and said absorbing force detecting portion detects the absorbing force by said absorbing means on the basis of the judgement result concerning said each absorption head by said absorption head position relation judgement portion.

Then, since the absorbing force by the absorbing means is detected on the basis of the judgement result of the position relation of the respective absorption heads with respect to the parts displayed, correct absorbing force by the absorption heads located at the position where proper absorbing force can be exercised on the parts can be detected, in addition to the 4th proposal, so it's very convenient.

Besides, the 6th proposal of the present invention is the parts classification unit as set forth in the 1st proposal wherein said absorbing means has an absorption head aggregate comprised of a plurality of absorption heads, an absorption head position relation judgement portion for judging the position relation of each of said absorption heads of said absorbing means with respect to said parts displayed on said image display portion is provided, and said program composing portion composes and outputs said absorption carriage program, composing a control command concerning said each absorption head of said absorbing means on the basis of the judgement result concerning said each absorption head by said absorption head position relation judgement portion.

Then, the control command concerning each absorption head is composed in such a manner that the absorption heads located at the position where proper absorbing force can be exercised on the actual parts on the basis of the judgement result of the position relation of the respective absorption heads with respect to the parts displayed is "on" at the time of absorption, and the absorption heads located at the position where proper absorbing force can not be exercised on the actual parts is "off" at the time of absorption. Accordingly, in addition to the effects of the 1st proposal, such a trouble that a sheet workpiece or dust, for instance, excluding the objective parts could be absorbed by the absorption head by making the absorption head located off the parts "on" at the time of actual absorption can be prevented. So, it's very convenient.

Besides, the 7th proposal of the present invention is the parts classification unit as set forth in the 1st proposal wherein a location information computing portion for computing location information of said parts in said first position on the basis of the absorbing position of said absorbing means with respect to said parts computed by said absorbing position computing portion as the positioning information of said absorbing means in said first position is provided.

Then, the location information in the first position concerning the parts is computed as the positioning information of the absorbing means in the first position. Accordingly, in addition to the effects of the 1st proposal, the computing procedures in the composition of the moving.positioning command of the absorbing means at the time of composing absorption carriage program are made easy by this location information, and this program composing time is shortened. So, it s very convenient.

Besides, the 8th proposal of the present invention is the parts classification unit as set forth in the 1st proposal wherein a classification information computing portion for computing classification information of said parts in said second position on the basis of the absorbing position of said absorbing means with respect to said parts computed by said absorbing position computing portion as the positioning information of said absorbing means in said second position is provided.

Then, the classification information in the second position concerning the parts is computed as the positioning information of the absorbing means with respect to the second position. Accordingly, in addition to the effects of the 1st proposal, the computing procedures in the composition of the moving.positioning command of the absorbing means at the time of composing absorption carriage program are made easy by this classification information, and this program composing time is shortened. So, it's very convenient.

Besides, the 9th proposal of the present invention is the parts classification unit as set forth in the 1st proposal wherein said first position is a classification head to be used in a laser beam machining equipment, for locating a sheet workpiece machined by laser beam cutting, and the second position is a pallet for classifying parts to be used in said laser beam machining equipment.

Then, in addition to the effects of the 1st proposal, this is applied in the laser beam machining equipment. So, it's very convenient.

Besides, the 10th proposal of the present invention is a parts classification unit for absorbing parts made by cutting and machining a sheet workpiece and carrying from a first position to a second position through absorbing carriage means and classifying, said parts classification unit comprising:

an absorbing position information storing portion for storing absorbing position information concerning the absorbing position of said absorption carriage means with respect to a plurality of parts groups, said parts group being comprised of one or more parts in the same shape to be classified;

a parts location information storing portion for storing location information at said first position concerning individual parts belonging to said plurality of parts groups;

a shape information storing portion for storing parts shape information of said parts to be classified and area shape information of parts classification area in said second position;

a parts classification position computing portion for computing and composing parts classification position information by computing classification position of said each parts group with respect to said parts classification area on the basis of said parts shape information and said area shape information stored in said shape information storing portion;

a parts classification position information storing portion for storing the parts classification position information computed by said parts classification position computing portion;

a parts corresponding information detecting portion for detecting absorbing position information, location information and parts classification position information corresponding to said parts concerning individual parts in said each parts group from the absorbing position information stored in said absorbing position information storing portion, the location information stored in said parts location information storing portion and the parts classification position information stored in said parts classification position information storing portion; and a program composing portion for composing and outputting a classification program with respect to said individual parts, composing moving.positioning command of said absorption carriage means from said first position to said second position on the basis of the detecting result by said parts corresponding information detecting portion for said individual parts.

With this structure, the classification position of each parts group with respect to the parts classification area of the second position is computed on the basis of the parts shape information and the area shape information so as to compose the parts classification position information, the absorbing position information, the location information and the parts classification position information corresponding to the individual parts are detected from the absorbing position information of each parts group, the location information of the individual parts and the parts classification position information of each parts group, and the classification program is composed and output by these detected information, composing the moving.positioning command of the absorbing carriage means for individual parts. Then, in the present invention, in order to compute the parts classification position information for each shape of the parts in the second position, such as the pallet 10, that is, of each parts group, it is not necessary to actually locate the respective shapes of the parts on the pallet with hands, different from the conventional way. Furthermore, in the present invention, in order to compose moving.positioning command of the absorption carriage means for positioning the parts absorbed and carried from the first position by the absorption carriage means at the second position, it is not necessary to execute teaching with an absorption carriage unit, using actual parts, different from the conventional way. In the present invention as mentioned above, teaching is not necessary, the operation of arranging the actual parts on the pallet with hands is not necessary. Then, the classification operation time can be widely shortened without much labor.

Besides, the 11th proposal of the present invention is the parts classification unit as set forth in the 10th proposal wherein a parts cutting information storing portion for storing parts cutting information with respect to a sheet workpiece for individual parts belonging to said plurality of parts groups is provided, and a parts location information computing portion for computing location information concerning said individual parts in said first position on the basis of the parts cutting information stored in said parts cutting information storing portion and the absorbing position information stored in said absorbing position information storing portion as positioning information with respect to said first position of said absorption carriage means is provided.

Then, since the location information concerning the individual parts is computed as the positioning information of the absorption carriage means with respect to the first position, the computing when the moving.positioning command of the absorption carriage means is composed on the basis of the location information is made easy and the computing time is shortened and the computing program is made simple, in addition to the effects of the 10th proposal. So, it's very convenient. Besides, since the location information is computed on the basis of the parts cutting information concerning the individual parts with respect to the sheet workpiece, the parts cutting information composed in a conventional way can be used as it is, so it's very convenient.

Besides, the 12th proposal of the present invention is the parts classification unit as set forth in the 10th proposal wherein said part classification position computing portion computes and composes parts classification position information by computing the classification position of said each parts group with respect to said parts classification area on the basis of said parts shape information and said area shape information stored in said shape information storing portion and the absorbing position information stored in said absorbing position information storing portion as the positioning information of said absorption carriage means with respect to said parts classification area.

Then, since the parts classification position information of the each parts group is computed as the positioning information of the absorption carriage means with respect to the parts classification area, the computing when the moving-.positioning command of the absorption carriage means is composed on the basis of the parts classification position information is made easy and the computing time is shortened and the computing program is made simple, in addition to the effects of the 10th proposal. So, it's very convenient.

Besides, the 13th proposal of the present invention is the parts classification unit as set forth in the 10th proposal wherein a parts cutting information storing portion for storing parts cutting information with respect to a sheet workpiece for individual parts belonging to said plurality of parts groups is provided, and a parts location information computing portion for computing location information concerning said individual parts in said first position on the basis of the parts cutting information stored in said parts cutting information storing portion and the absorbing position information stored in said absorbing position information storing portion as positioning information of said absorbing carriage means with respect to said first position is provided, said part classification position computing portion computes and composes parts classification position information by computing the classification position of said each parts group with respect to said parts classification area on the basis of said parts shape information and said area shape information stored in said shape information storing portion and the absorbing position information stored in said absorbing position information storing portion as the positioning information of said absorbing carriage means with respect to said parts classification area, and said program composing portion composes moving.positioning instruction of said absorbing carriage means from said first position to said second position for said individual parts from the location information which is the positioning information of said absorbing carriage means with respect to said first position and the parts classification positioning information which is the positioning information of said absorbing carriage means with respect to said parts classification area, corresponding to said individual parts.

Then, since the location information concerning the individual parts is computed as the positioning information of the absorption carriage means with respect to the first position and the parts classification position information of the each parts group is computed as the positioning information of the absorption carriage means with respect to the parts classification area, the computing when the moving-.positioning command of the absorption carriage means is composed on the basis of the location information and the parts classification position information is made easy and the computing time is shortened and the computing program is made simple, in addition to the effects of the 10th proposal. So, it's very convenient.

Besides, the 14th proposal of the present invention is the parts classification unit as set forth in the 10th proposal wherein a part location judging portion for judging and outputting possibility or impossibility of location with respect to said parts classification area for said parts to be classified on the basis of said parts shape information and said area shape information stored in said shape information storing portion is provided.

Then, since the parts which can not be classified on the parts classification area because of too big size can be checked in advance, such a trouble that the parts which can not be classified would be carried at the time of actual classification operation can be avoided, in addition to the effects of the 10th proposal. So, smooth classification is realized.

Besides, the 15th proposal of the present invention is the parts classification unit as set forth in the 10th proposal wherein a plate thickness information storing portion for storing plate thickness information of said parts to be classified is provided, and a piling height computing portion for computing and outputting piling height of parts of said each parts group from the plate thickness information stored in said plate thickness information storing portion and the number of the parts to be classified belonging to said each parts group is provided.

Then, an inadvertent piling exceeding the piling limited height in the second position at the time of classification can be prevented by computing and outputting the piling height of the parts concerning each parts group, in addition to the effects of the 10th proposal. So, it's safety.

Besides, the 16th proposal of the present invention is the parts classification unit as set forth in the 15th proposal wherein a piling possibility judging portion for judging and outputting the possibility of piling parts concerning said each parts group in said parts classification area on the basis of the piling height computed by said piling height computing portion is provided.

Then, the possibility of piling parts is judged on the basis of the computed piling height. So, in addition to the effects of the 15th proposal, such an inconvenience that the parts group could be piled as highly as exceeding the piling limited height in the second position can be prevented by the judgement result. Accordingly, safety is improved more and more.

Besides, the 17th proposal of the present invention is the parts classification unit as set forth in the 10th proposal wherein said absorbing carriage means has a frame with which a rotational center is provided, being free to move and position in a level direction between said first position and said second position, an absorption head capable of absorbing parts is provided with said frame, being free to move and position, and said program composing portion composes a moving.positioning command of said absorbing carriage means, being comprised of a moving.positioning command in a level direction of said frame and a rotationally moving.positioning command with said rotational center of said frame as its center.

Then, the moving.positioning command of the absorption carriage means can be comprised of the moving.positioning command of the frame in the level direction and rotational moving.positioning command with the rotational center of the frame as its center. So, in addition to the effects of the 10th proposal, the dimension where values are to be set when the moving.positioning command of the absorption carriage means is composed is extremely decreased, programming is made easy, so it's very advantageous.

Besides, the 18th proposal of the present invention is the parts classification unit as set forth in the 10th proposal wherein said first position is a classification head to be used in a laser beam machining equipment, for locating a sheet workpiece machined by laser beam cutting, and the second position is a pallet for classifying parts to be used in said laser beam machining equipment.

Then, in addition to the effects of the 10th proposal, this is applied in the laser beam machining equipment. So, it's very convenient.

Besides, the 19th proposal of the present invention is the parts classification unit as set forth in the 18th proposal wherein a parts location information computing portion for computing the parts cutting information showing the cutting position of the individual parts with respect to the individual sheet workpiece cut and machined with laser beam in said laser beam machining equipment on the basis of said parts shape information and the number of the parts, and for computing location information in said first position on the basis of said computed parts cutting information is provided.

Then, in addition to the effects of the 18th proposal, the parts cutting information necessary for laser beam cutting machining can be computed and composed in the parts classification unit. Furthermore, the location information can be computed and composed, making use of this parts cutting information, so it's very convenient.

Besides, the 20th proposal of the present invention is a parts classification unit for absorbing parts made by cutting and machining a sheet workpiece through absorbing carriage means and carrying from a first position to a second position and classifying, said parts classification unit comprising:

a shape information storing portion for storing parts shape information of a parts group comprised of one or more parts to be classified in the same shape;

a parts number storing portion for storing the number of parts belonging to said parts group concerning said each parts group;

an image display portion for displaying the parts belonging to said each parts group on the basis of said parts shape information stored in said shape information storing portion;

an absorbing position instructing means, capable of instructing absorbing position of said absorbing carriage means with respect to parts displayed on said image display portion, belonging to said each parts group, operable by an operator;

an absorbing position computing portion for computing the absorbing position of said absorbing carriage means with respect to said parts belonging to said each parts group, instructed by said absorbing position instructing means, as absorbing position information;

an absorbing position information storing portion for storing the absorbing position information computed by said absorbing position computing portion;

a parts location information computing portion for computing location information in said first position concerning the individual parts on the basis of said parts shape information stored in said shape information storing portion and the number of the parts stored in said parts number storing portion;

a parts location information storing portion for storing the parts location information computed by said parts location information computing portion;

a positioning information computing portion for computing positioning information in said first position of said absorbing carriage means with respect to said individual parts belonging to said each parts group on the basis of the absorbing position information stored by said absorbing position information storing portion and the location information stored in said parts location information storing portion; and a program composing portion for composing and outputting a classification program with respect to said individual parts in such a manner that moving.positioning command of said absorbing carriage means from said first position to said second position is composed for said individual parts on the basis of said positioning information computed by said positioning information computing portion.

With this structure, the parts is displayed, the absorbing position of the absorption carriage means with respect to the parts is instructed by an operator watching this display through the absorbing position instructing means, then the absorbing position information is computed on the basis of this instruction. That is, since the positioning information of the absorption carriage means with respect to the parts at the time of actual absorbing and carrying is computed on the basis of the operation by an operator according to the display and the moving.positioning command of the absorption carriage means is composed on the basis of the positioning information made in this way, it is not necessary to execute teaching using actual parts, different from a conventional way, and classification operation time can be shortened more extremely. Besides, since teaching is not necessary, smooth classification operation realizes without operation interruption for teaching during classification operation. Furthermore, the absorbing position of the absorption carriage means may be instructed for each parts group comprised of the same shape of the parts, and it is not necessary to set information concerning the same shape of an individual parts, different from a conventional way. So, the operation concerning information setting of a unit can be executed in a short time. In the present invention as mentioned above, the parts classification operation can be executed in a short time.

Besides, the 21st proposal of the present invention is the parts classification unit as set forth in the 20th proposal wherein said parts location information computing portion computes the location information in said first position concerning said individual parts as the positioning information of said absorbing carriage means with respect to said first position on the basis of the absorbing position information concerning the parts belonging to each parts group stored by said absorbing position information storing portion, said parts shape information of each parts group stored in said shape information storing portion, said parts number of the parts belonging to each parts group stored in said parts number storing portion.

Then, since the location information concerning the individual parts is computed as the positioning information of the absorption carriage means with respect to the first position, the computing when the moving.positioning command of the absorption carriage means is composed on the basis of the location information is made easy and the computing time is shortened and the computing program is made simple, in addition to the effects of the 20th proposal. So, it's very convenient.

Besides, the 22nd proposal of the present invention is the parts classification unit as set forth in the 20th proposal wherein said absorbing carriage means has a frame with which rotational center is provided, being free to move and position in a level direction between said first position and said second position, an absorption head capable of absorbing parts is provided with said frame, being free to move and position, and said program composing portion composes a moving.positioning command of said absorbing carriage means from said first position to said second position in such a manner that only the movement quantity in a level direction of said frame and/or the rotational movement quantity with said rotational center of said frame as its center are different between these parts concerning said parts belonging to said same parts group and said parts having different shape are not overlapped each other in said second position in absorbing, carrying and classifying concerning said parts having different shape.

Then, in addition to the effects of the 20th proposal, the dimension where values are to be set when the moving.positioning command of the absorption carriage means is composed is extremely decreased, programming is made easy, so it's very advantageous. Besides, the different shape of the parts are not overlapped each other in the second position. So, it's very convenient.

Besides, the 23rd proposal of the present invention is the parts classification unit as set forth in the 20th proposal wherein said first position is a classification head to be used in a laser beam machining equipment, for locating a sheet workpiece machined by laser beam cutting, and the second position is a pallet for classifying parts to be used in said laser beam machining equipment.

Then, in addition to the effects of the 20th proposal, this is applied in the laser beam machining equipment. So, it's very convenient.

Besides, the 24th proposal of the present invention is the parts classification unit as set forth in the 23rd proposal wherein said parts location information computing portion can compute the parts cutting information showing the cutting position of the individual parts with respect to the individual sheet workpiece cut and machined with laser beam in said laser beam machining equipment on the basis of said parts shape information and the number of the parts, and compute location information in said first position on the basis of said computed parts cutting information.

Then, in addition to the effects of the 23rd proposal, the parts cutting information necessary for laser beam cutting machining can be computed and composed in the parts classification unit. Furthermore, the location information can be computed and composed, making use of this parts cutting information, so it's very convenient.

BRIEF DESCRIPTION OF THE DRAWINGS

FIG. 5 is a view obliquely seen, showing a suspension frame and a head unit and the like;

FIG. 21 is a view showing material.density table;

FIG. 22 is a view showing parts.robot information;

FIG. 23 is a view showing nesting schedule files;

FIG. 28 is a view showing sheet nesting information;

FIG. 29 is a view showing a classification program; and

DESCRIPTION OF THE PREFERRED EMBODIMENT

Embodiments of the present invention will now be described hereinafter with respect to the accompanying drawings.

Figure 1:
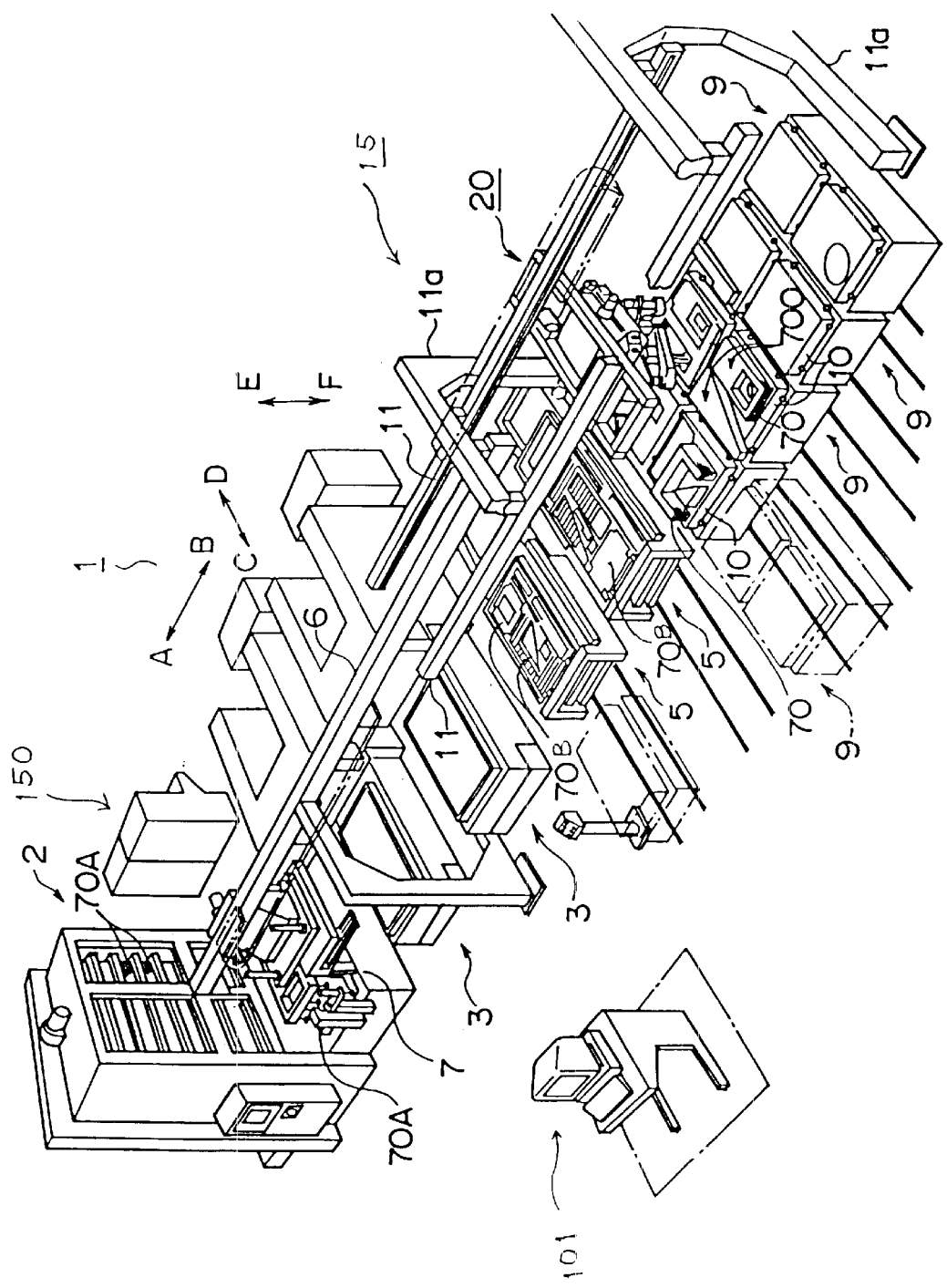
FIG. 1 is a view obliquely seen, typically showing the whole laser beam machining equipment.

As shown in FIG. 1, a laser beam machining equipment 1 has a well-known raw material stocker 2, which piles and stores a lot of sheet workpieces 70A which are material workpieces in the shape of a plate, and which can appropriately take the sheet workpiece 70A to be machined out of a lot of sheet workpieces 70A piled and stored. With the side of the raw material stocker 2 (the right side of the paper of FIG. 1), a plurality of well-known laser beam machines 3 (two laser beam machines in the present embodiment), capable of cutting and machining the above-mentioned sheet workpiece 70A with laser beam are provided. With the side rather than the two laser beam machines 3, 3 (the right side of the paper of FIG. 1), a plurality of well-known classification heads 5 (two classification heads in the present embodiment), capable of locating machined sheet workpieces 70B cut and machined by the laser beam machine 3, are provided. Then, the raw material stocker 2, the laser beam machines 3, 3, and the classification heads 5, 5 are located in a predetermined horizontal carrier direction (the direction as shown by the arrows A and B of the figure) in a row.

On the upper hand of the raw material stocker 2, the laser beam machines 3, 3 and the classification heads 5, 5, a guide rail 6 is provided, extending in the above-mentioned carrier direction (the direction as shown by the arrows A and B of the figure), so as to mutually communicate among these. A well-known carrier robot 7 is provided with the guide rail 6, being free to move and drive in the carrier direction along the guide rail 6, and can carry the sheet workpiece 70A from the raw material stocker 2 to each laser beam machine 3 with vacuum pads or the like, and can carry the machined sheet workpiece 70B from each laser beam machine 3 to each classification head 5 with a fork or the like.

On the other hand, a plural number of well-known workpiece stockers 9 (four in the present embodiment) are provided with the side rather than two classification heads 5, 5 (the right side of the paper of FIG. 1 (the arrow B side)), aligning and locating along the carrier direction. On each workpiece stocker 9, a pallet 10 in the shape of a plate is attachably and detachably provided, which can pile and locate a plural number of parts 70 taken out of the above-mentioned machined sheet workpiece 70B as well as can align and locate workpiece piles 700 made by piling many parts 70. As shown in FIG. 1, on the upper hand of the classification heads 5, 5 and the plural number of wokpiece stockers 9, a pair of guide rails 11, 11, which are parallel to each other, are located through appropriate support members 11a, 11a, extending in the carrier direction so as to mutually communicate among the classification heads 5, 5 and a plural number of workpiece stockers 9. A palletizing robot 20 is provided with these guide rails 11, 11.

Figure 2:
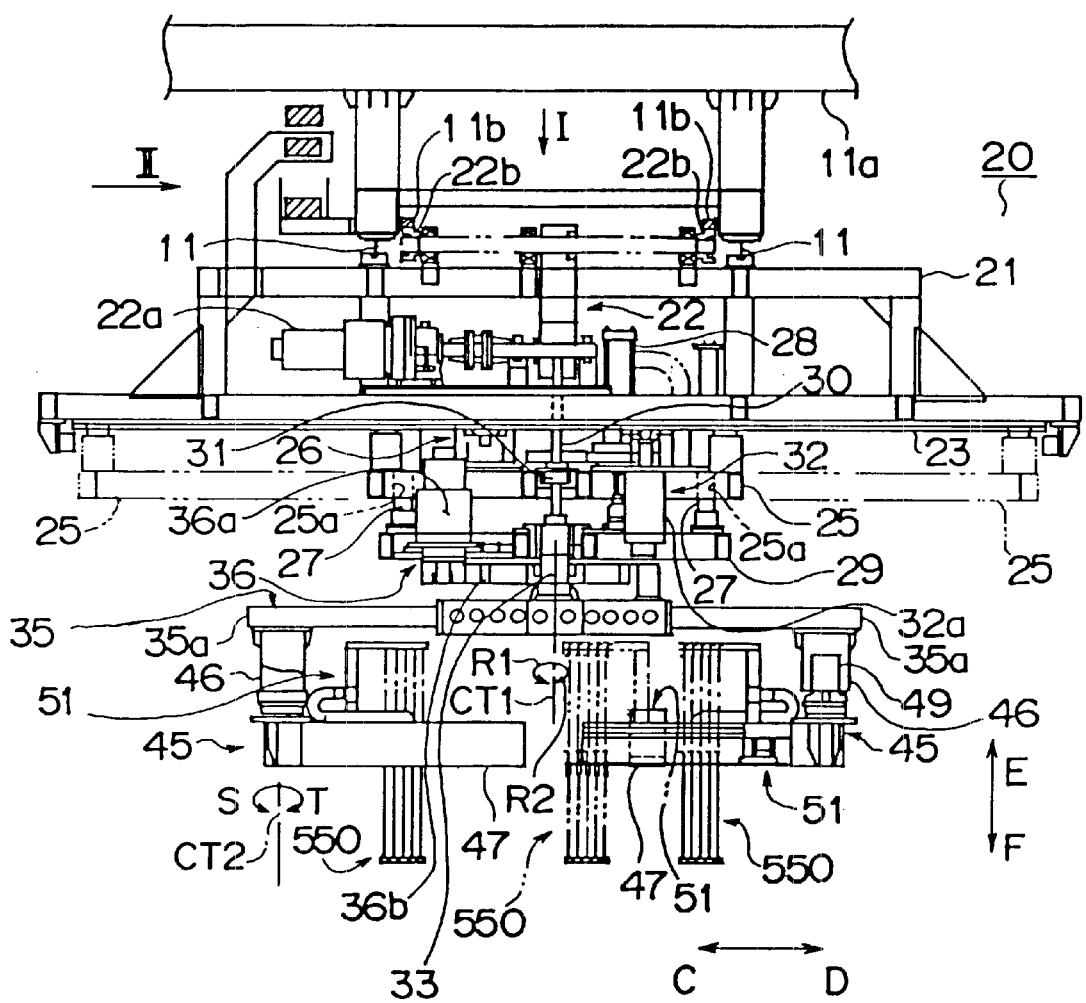
FIG. 2 is a side sectional view showing a palletizing robot.
Figure 3:
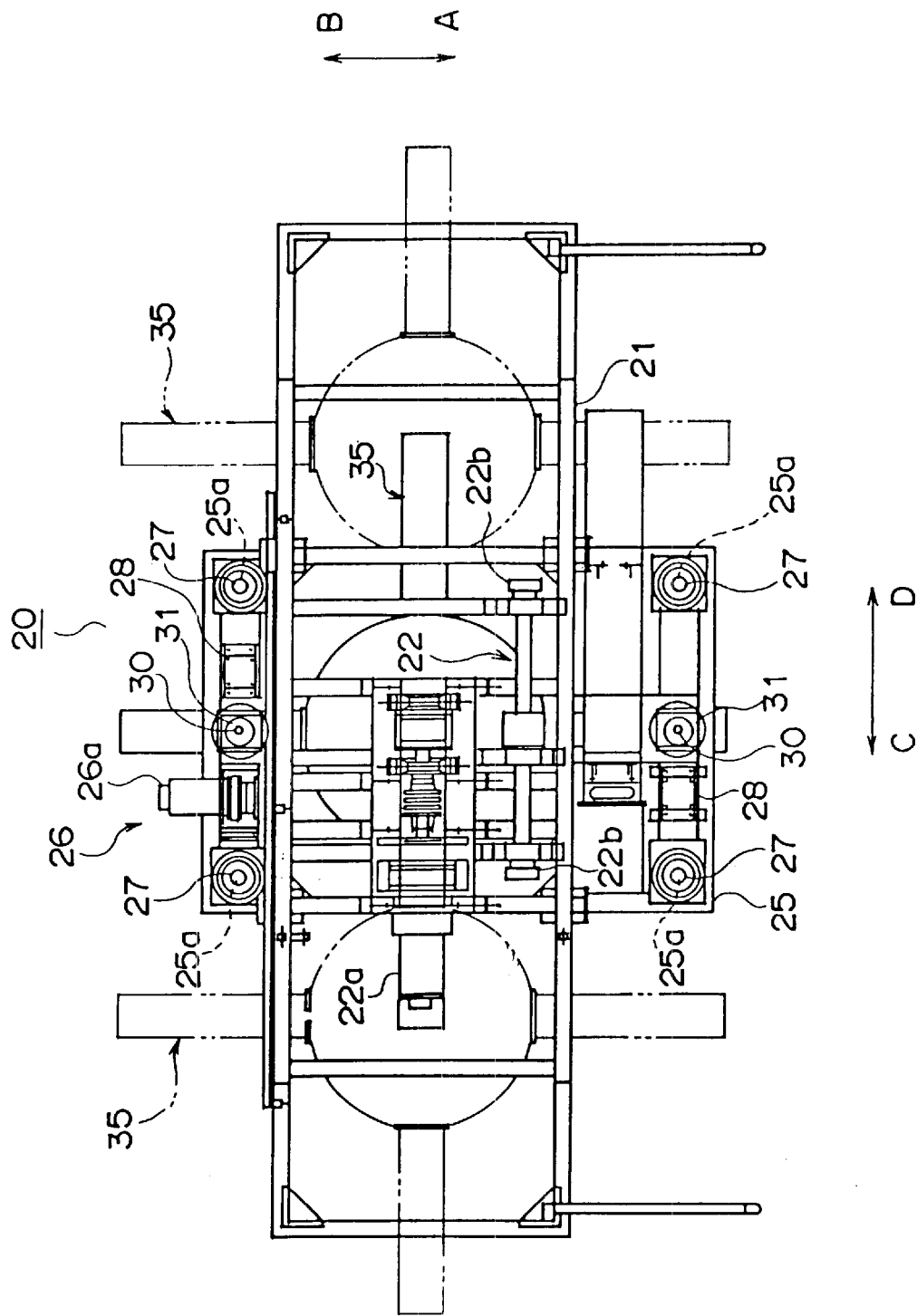
FIG. 3 is a view seen from the arrow I of FIG. 2.
Figure 4:
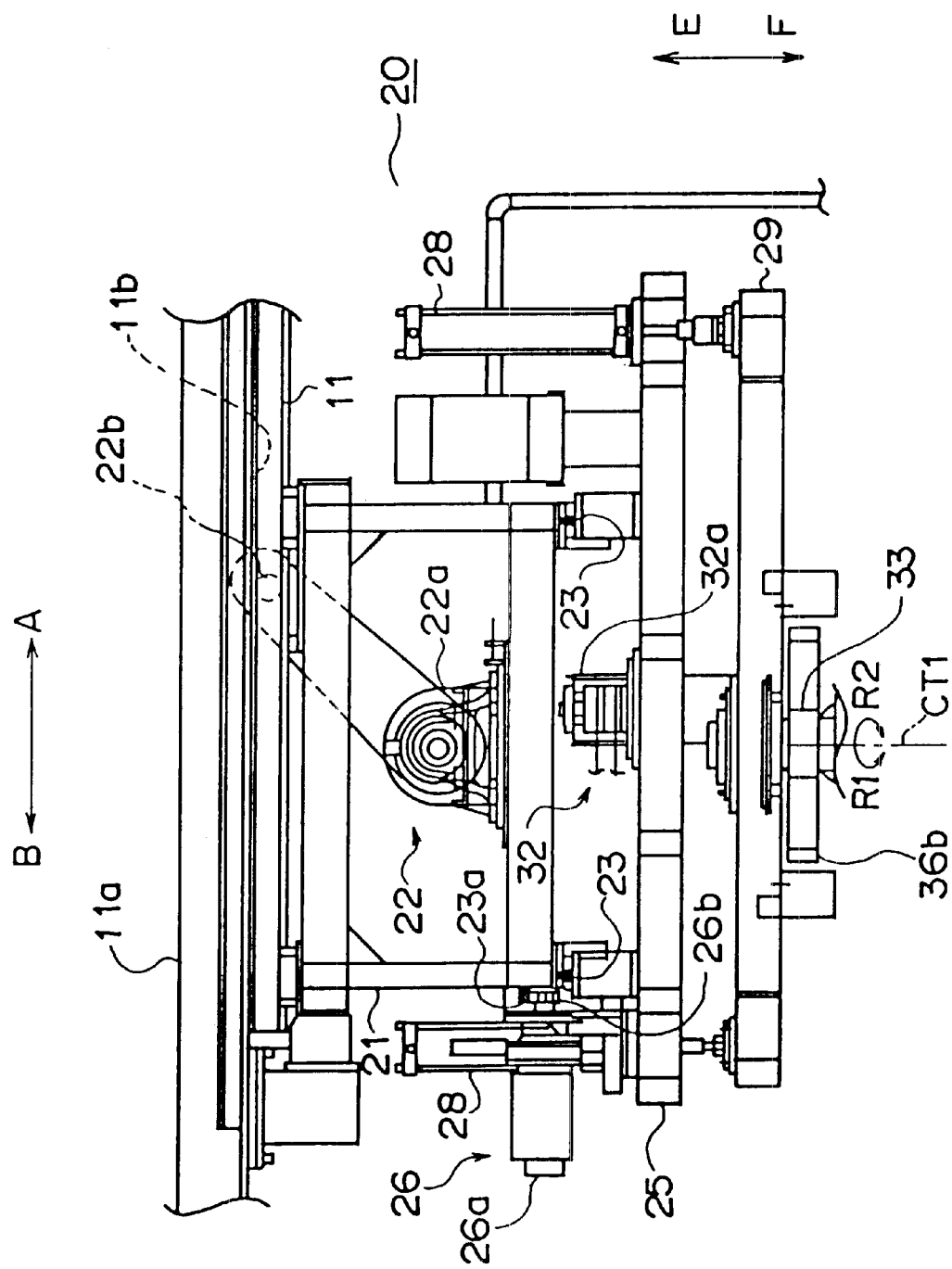
FIG. 4 is a view seen from the arrow II of FIG. 2 (sectional view in part)

As shown in FIGS. 2 through 4 (but, the guide rails 11, 11 are omitted in FIG. 4), the palletizing robot 20 has a suspension frame 21, being suspended so as to be movable in the carrier direction along the guide rails 11, 11. A travel driving unit 22, which is comprised of a motor 22a and gears 22b, 22b rotated and driven by the motor 22a, is provided with the suspension frame 21. Besides, racks 11b, 11b are provided with the support member 11a along the guide rails 11, 11. Each gear 22b of the travel driving unit 22 is engaged with each rack 11b.

A pair of movement rails 23, 23, which are parallel to each other, are provided with the suspension frame 21, extending in the horizontal direction (the direction as shown by the arrows C and D), making right angle with the carrier direction (the direction as shown by the arrows A and B). A first frame 25 is provided with these movement rails 23, 23 so as to be suspended, and the first frame 25 is free to move in the direction as shown by the arrows C and D along the movement rails 23, 23. A move driving unit 26, which is comprised of a motor 26a and a gear 26b rotated and driven by the motor 26a and the like, is provided with the first frame 25, as shown in FIG. 4. And, a rack 23a is provided with the suspension frame 21 along the movement rail 23, and is engaged with the gear 26a of the move driving unit 26.

A plurality of guide holes 25a are formed on the first frame 25, penetrating in up and down direction, as shown in FIGS. 2 and 3 (In the present embodiment, four holes are formed as shown in FIG. 3). A rod 27 extending in up and down direction is slidably inserted into each guide hole 25a. A second frame 29 is connected with the lower end side of these rods 27, and is free to move in the up and down direction (the direction as shown by the arrows E and F of the figure) with respect to the first frame 25. As shown in FIGS. 2 through 4, balancers 28 (two balancers in the present embodiment) which are air pressure cylinders units are provided between the first frame 25 and the second frame 29. The load of the second frame 29 side is supported in the first frame 25 by these balancers 28. Screw members 30 in the shape of a bar (two screw members in the present embodiment), extending in the upper direction are provided with the second frame 29, penetrating the first frame 25, as shown in FIGS. 2 or 3. Nut members 31 (two in the present embodiment) are provided with the first frame 25 so as to fix only in the up and down direction with respect to the first frame 25. These respective nut members 31 are engaged with the respective screw members 30 so as to comprise a ball screw unit.

Furthermore, a nut driving unit 32, having a motor 32a, capable of rotating and driving the respective nut members 31 by the power from the motor 32a is provided with the first frame 25. Besides, an axis 33 extending in the up and down direction so as to project in the lower direction rather than the second frame 29 (the direction as shown by the arrow F) is provided with the second frame 29, being free to axially rotate in the direction as shown by the arrows R1 and R2 (this direction is C-axis direction) with the rotational axis CT1 extending in up and down direction as its center. A suspension frame 35 is suspended on the lower end side of the axis 33. Between the second frame 29 and the axis 33, a rotation driving unit 36 is provided. As shown in FIG. 2, the rotation driving unit 36 is comprised of a motor 36a provided on the second frame 29 side and a pulley 36 rotated and driven by the motor 36a through a belt or the like, and this pulley 36b is fixedly provided with the axis 33. And, the axis 33 can be rotated and driven in the C-axis direction by the rotation of the pulley 36b.

Figure 5:
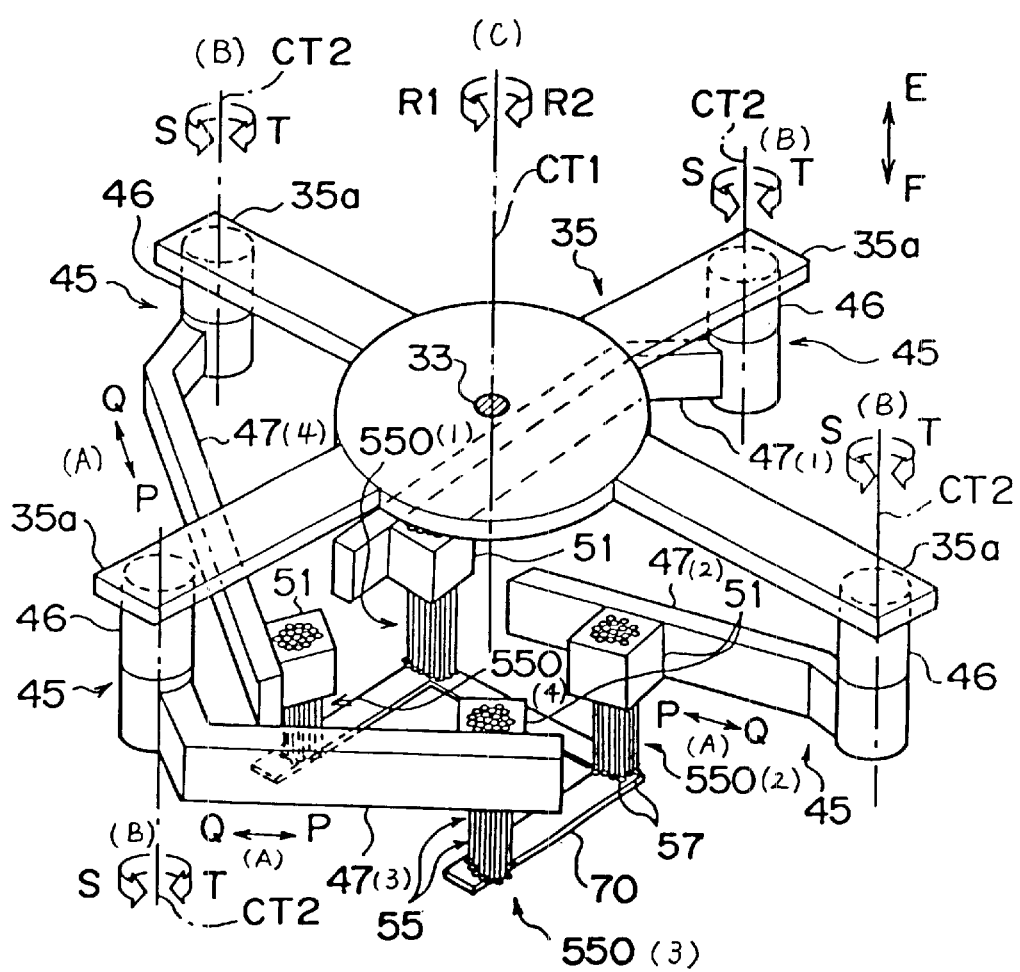
Figure 6:
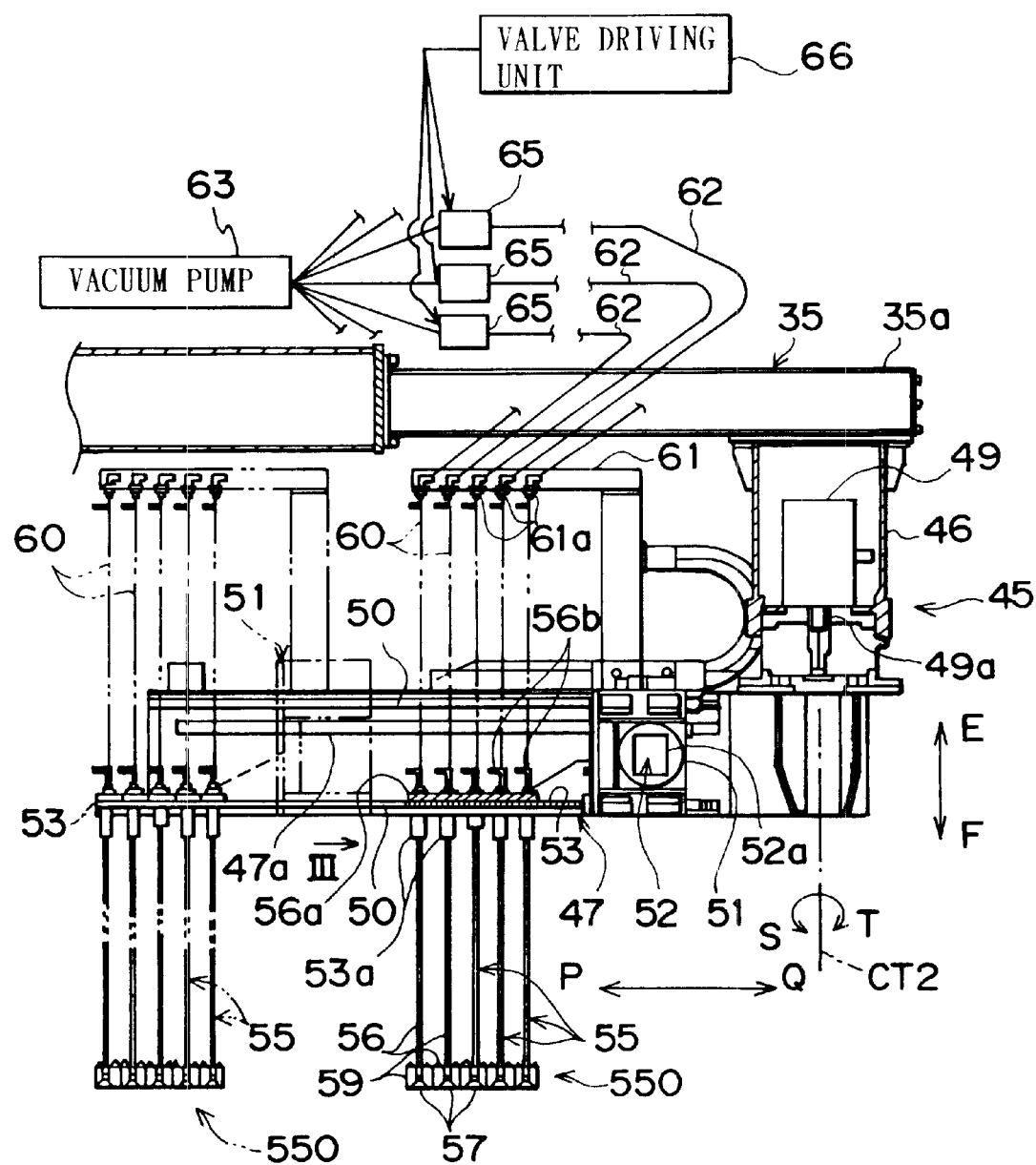
FIG. 6 is a side view showing one of the head units in detail (sectional view in part)
Figure 8:
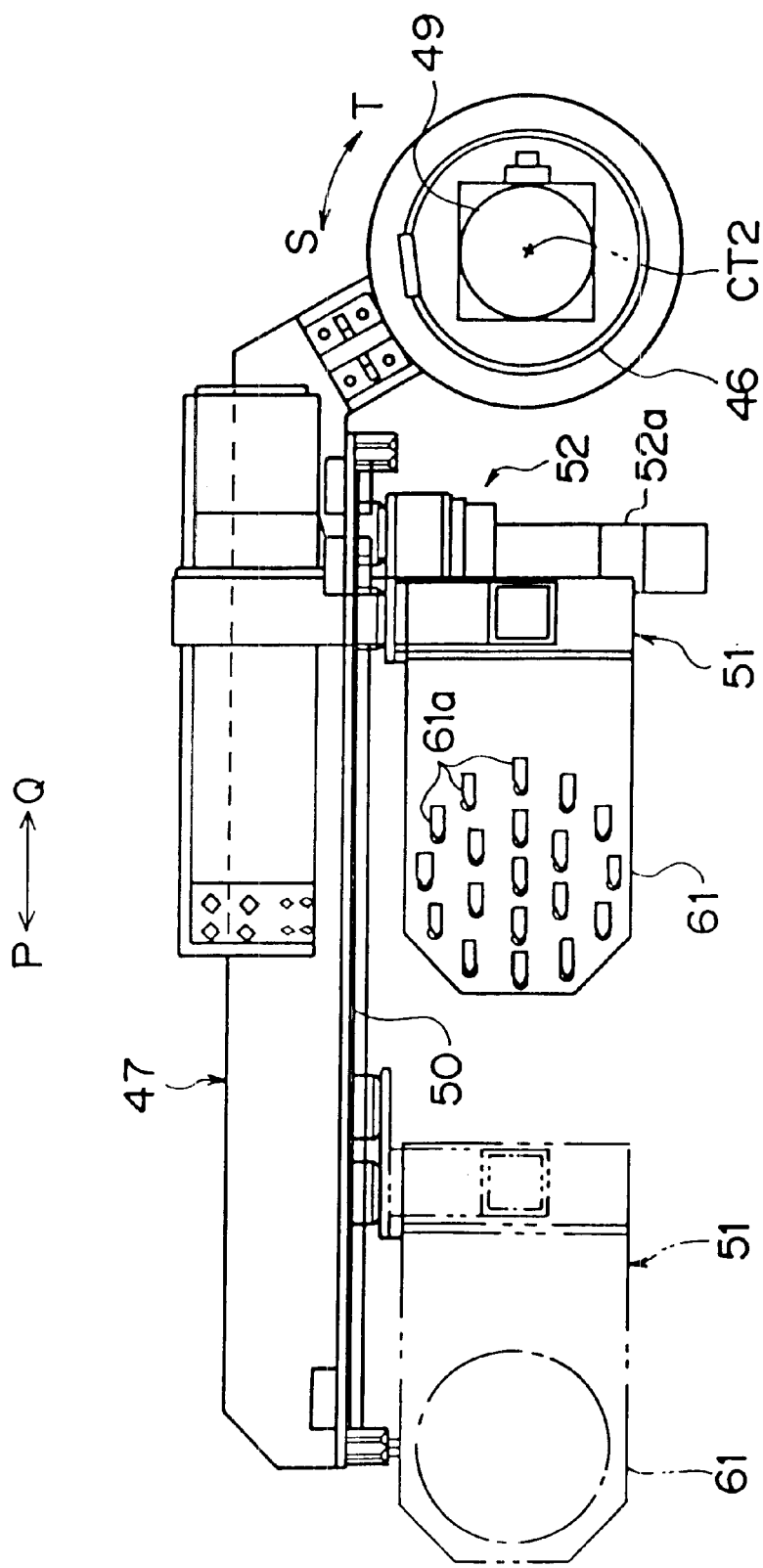
FIG. 8 is a view showing the head unit, seen from the upper (sectional view in part)

The suspension frame 35 of the present embodiment is basically in the shape of almost level plate and the plane is in the shape of almost cross, as shown in FIGS. 2 and 5. A head unit 45 is provided with each end portion 35a near the ends of the four arm portions in the shape of a cross of the suspension frame 35 (The shape of the suspension frame 35 is optional, and one or more head units 45 may be provided.). As shown in FIGS. 5, 6 or 8, each head unit 45 has a bracket 46 fixed on the lower side of the end portion 35a, and an arm 47 which is level and almost straight is provided with the bracket 46, being free to rotate in the direction as shown by the arrows S and T in the figure (this direction is B-axis direction.) with the rotational axis CT2 extending in the up and down direction (the direction as shown by the arrows E and F) as its center. On this occasion, a driving motor 49 is provided with the bracket 46 portion. And, the side of an output axis 49a of this driving motor 49 is coaxially located with the rotational axis CT2 and is connected with the arm 47.

Rails for sliding 50, 50 are provided with the arms 47, extending along the arm 47 in the direction as shown by the arrows P and Q in the figure (that is, level direction, this direction is A-axis direction) which is the extending direction of the arm 47. A head frame 51 is provided, being free to slide in the A-axis direction along the rails for sliding 50, 50 (In FIG. 5, the rail for sliding 50 is omitted for simplification and the head frame 51 and the like are simply shown in the shape of a rectangular.) A slide driving unit 52, comprised of a motor 52a and a gear 52b rotated and driven by the motor 52a is provided with the head frame 51. A rack 47a is provided with the arm 47 along the arm 47. The gear 52b of the slide driving unit 52 is engaged with this rack 47a.

Figure 7:
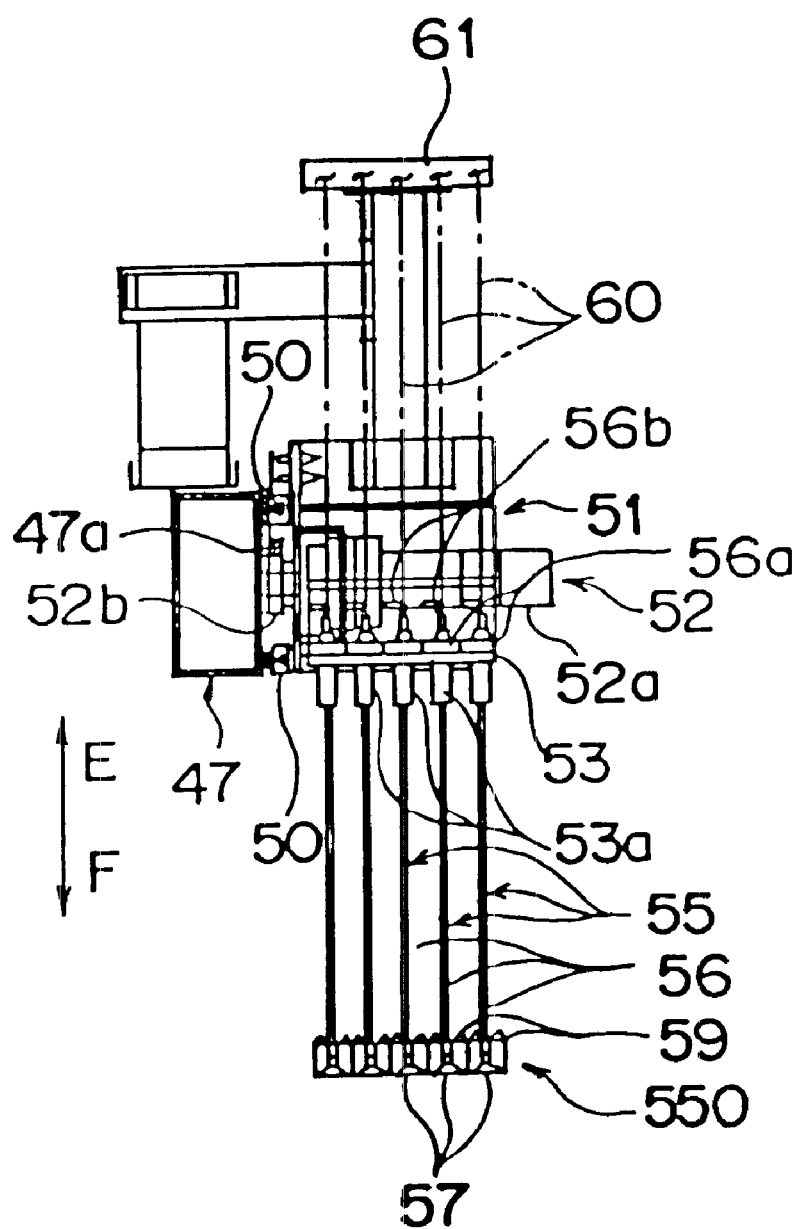
FIG. 7 is a view seen from the arrow III of FIG. 6 (sectional view in part)
Figure 9:
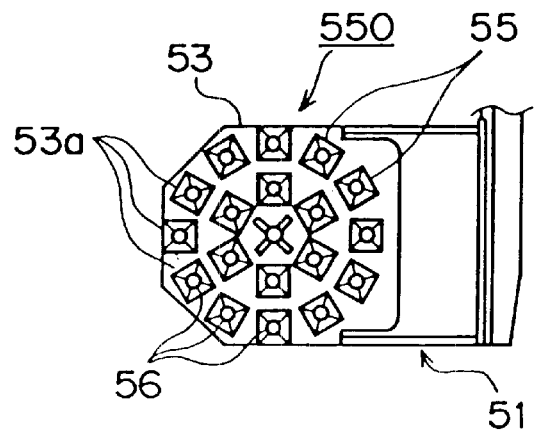
FIG. 9 is a top view showing only a head support portion of a head frame.

As shown in FIGS. 6, 7 and 9, a head support portion 53 in the shape of a level plate is formed on the head frame 51. A plurality of absorption heads 55 (the number is 19 in the present embodiment) are supported by the head support portion 53 through bushes 53a extending in the up and down direction. A plurality of absorption heads 55 supported by one head support portion 53 comprises an absorption head aggregate 550 as a bundle. Each absorption head 55 has a tube body 56 in the shape of a bar, extending in up and down direction, and this tube body 56 penetrates the head support portion 53 through the bush 53a and the like. That is, the tube body 56 is free to move in the direction as shown by the arrows E and F with respect to the head support portion 53. A stopper 56a having the size so as not to pass through the bush 53a, is provided at the portion near the top end of the tube body 56. The tube body 56 is supported by the head support portion 53 so as to stop on the head support portion 53 by the stopper 56a.

As shown in FIGS. 6, 7, 10, 11, pads 57 in the shape of a cone, which are vacuum pads, are provided, facing the lower hand (the direction as shown by the arrow F) with the lower end of the tube bodies 56. Besides, pad protecting members 59 (The pad protecting members 59 are shown with two-dot chain line concerning only a part of the absorption head 55 in FIG. 11 for simplification.) in the shape of almost a cylinder, open in the lower direction, are provided at the portion near the lower end of the tube body 56, covering and protecting the periphery of the side of the pad 57. The upper side portion of the pad protecting member 59 is a taper portion 59a in the shape of a taper, making itself thinner for the upper hand. On this occasion, the inside of the pad 57 is connected and communicated with the inside of the tube body 56 through the lower end of the tube body 56. Tubes 60 (are shown with a straight line, such as a dashed line in respective figures for simplification), which are expandable spiral tubes, are connected with the upper end side of the tube bodies 56 through joints 56b, communicating these tube bodies 56 and the inside of the tube 60 with each other.

Figure 10:
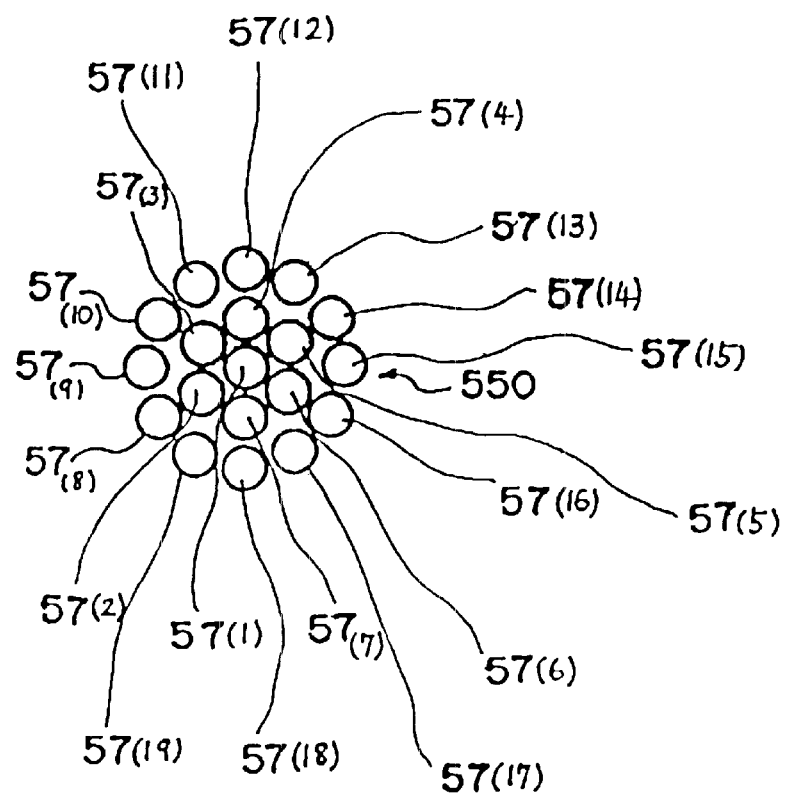
FIG. 10 is a view showing an absorption head aggregate, seen from the lower.
Figure 11:
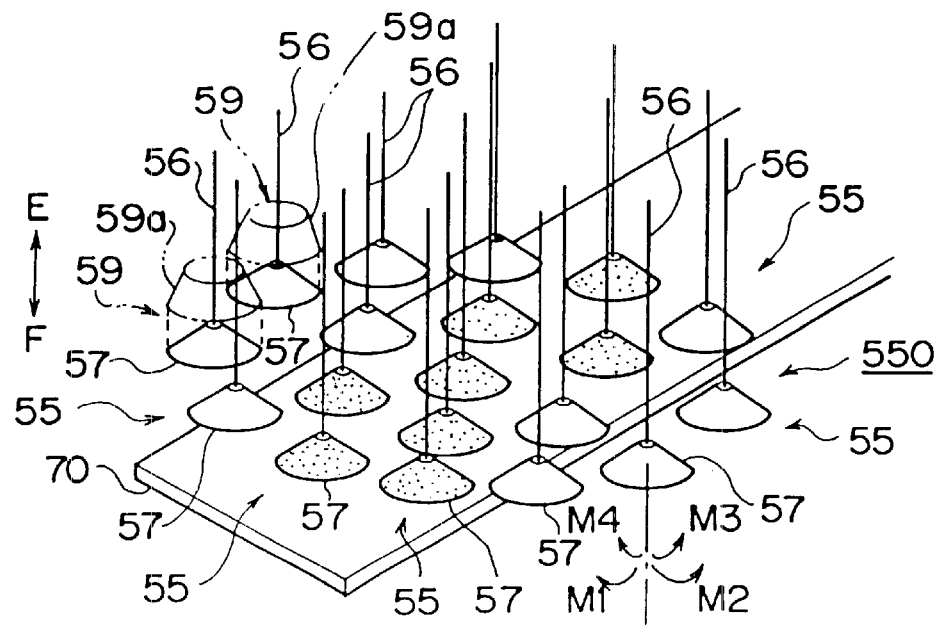
FIG. 11 is a view obliquely seen, showing the way of absorbing parts by the absorption head aggregate.

And, as shown in FIGS. 6 through 8, a horizontal tube support portion 61 in the shape of a plate is provided with the head frame 51, facing the head support portion 53 in the upper and lower direction above the head support portion 53. The end portion of the tube 60 of each absorption head 55 is connected with and supported by this tube support portion 61 through an appropriate joint 61a (which is omitted in FIG. 7). By doing so, it never happens that many tubes 60 might be twined. On this occasion, a pressure transfer member 62 which is comprised of another tube is connected with each tube 60 through the joint 61a. The top end of the pressure transfer member 62 is connected with a vacuum pump 63. During each pressure transfer member 62, a valve 65, free to open and close the inside of the pressure transfer member 62, is provided as shown in FIG. 6. A valve driving unit 66 is provided with these valves 65, being free to open and close, and to drive. The absorption head aggregate 550 which is comprised of a plurality of absorption heads 55 are densely located such that these pads 57 form circular outline, as shown in FIG. 10.

Figure 15:
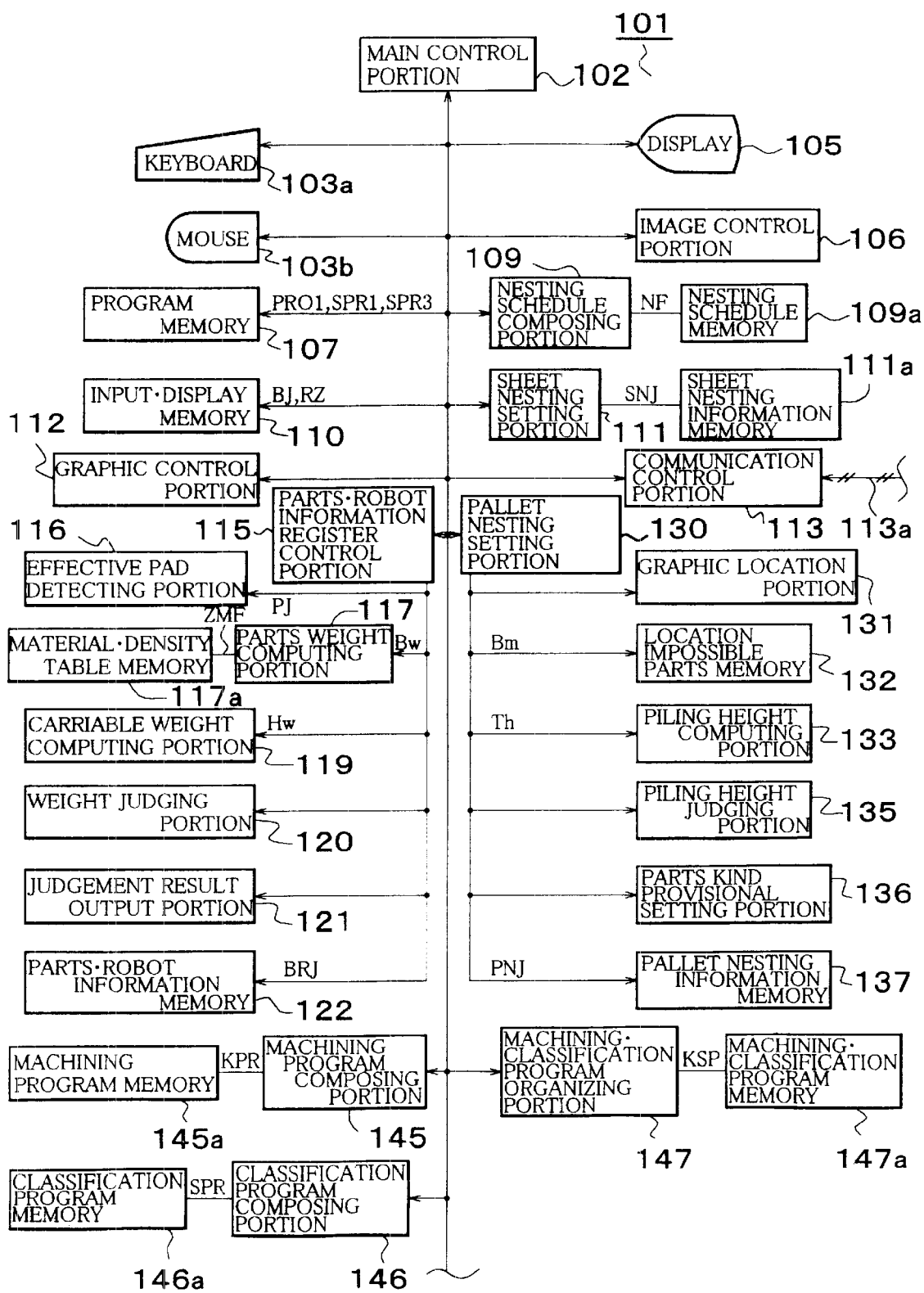
FIG. 15 is a block diagram showing a machining.classification program composing unit.

Besides, the laser beam machining equipment 1 has a machining.classification program composing unit 101 and a laser beam machining equipment control unit 150, as shown in FIG. 1. That is, the machining.classification program composing unit 101 has a main control portion 102, as shown in FIG. 15. A keyboard 103a, a mouse 103b, a display 105, an image control portion 106, a program memory 107, a nesting schedule composing portion 109, an input.display memory 110, a sheet nesting setting portion 111, a graphic control portion 112, a communication control portion 113, a parts.robot information register control portion 115, a pallet nesting setting portion 130, a machining program composing portion 145, a classification program composing portion 146, a machining.classification program organizing portion 147 are connected with the main control portion 102 via a bus line. Furthermore, a nesting schedule memory 109a is connected with the nesting schedule composing portion 109, a sheet nesting information memory 111a is connected with the sheet nesting setting portion 111, a machining program memory 145a is connected with the machining program composing portion 145, a classification program memory 146a is connected with the classification program composing portion 146, and a machining.classification program memory 147a is connected with the machining.classification program organizing portion 147. Besides, an effective pad detecting portion 116, a part weight computing portion 117, a carrying weight computing portion 119, a weight judging portion 120, a judgement result output portion 121, a parts.robot information memory 122 are connected with the parts.robot information register control portion 115. A material.density table memory 117a is connected with the parts weight computing portion 117. A graphic location portion 131, a location impossible parts memory 132, a piling height computing portion 133, a piling height judging portion 135, a parts kind provisional setting portion 136, a pallet nesting information memory 137 are connected with the pallet nesting setting portion 130. And, a cable 113a connected with the laser beam machining equipment control unit 150 side, decribed hereinafer is connected with the communication control portion 113.

Figure 16:
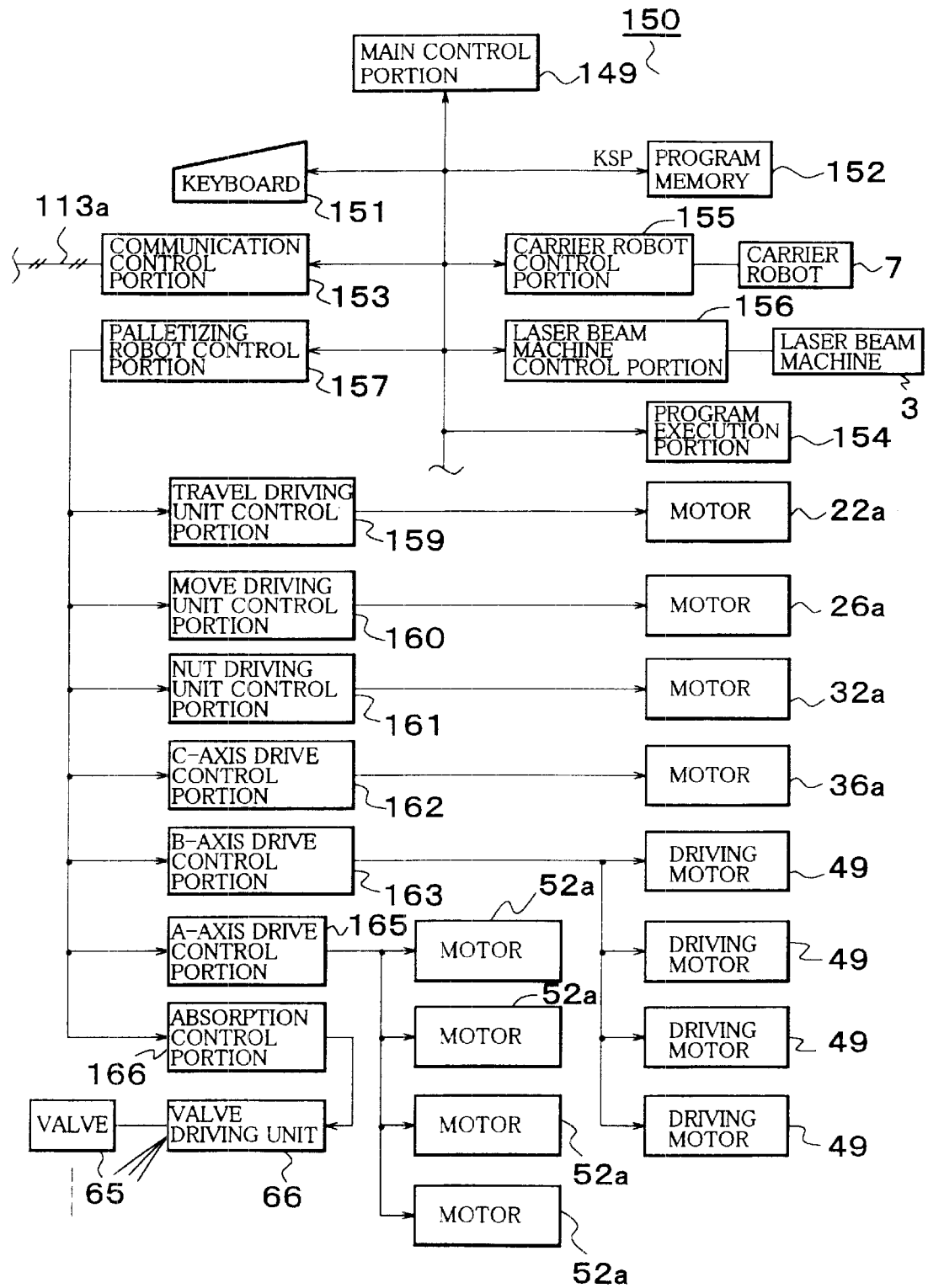
FIG. 16 is a block diagram showing a laser beam machining equipment control unit.

On the other hand, the laser beam machining equipment control unit 150 has a main control portion 149, as shown in FIG. 16. A keyboard 151, a program memory 152, a communication control portion 153, a program execution portion 154, a carrier robot control portion 155, a laser beam machine control portion 156 and a palletizing robot control portion 157 are connected with the main control portion 149 through a bus line. The carrier robot 7 (in the concrete, each driving unit for driving each moving part of the carrier robot 7) is connected with the carrier robot control portion 155, then the carrier robot 7 drives by the instruction from the carrier robot control portion 155. Each laser beam machine 3 (in the concrete, a laser beam oscillator of the laser beam machine 3 or each driving unit for driving each moving part) is connected with the laser beam machine control portion 156, then each laser beam machine 3 is driven by the instruction from the laser beam machine control portion 156 so as to machine. And, a travel driving unit control portion 159, a move driving unit control portion 160, a nut driving unit control portion 161, a C-axis driving control portion 162, a B-axis driving control portion 163, an A-axis driving control portion 165 and an absorption control portion 166 are connected with the palletizing robot control portion 157. The motor 22a of the travel driving unit 22 is connected with the travel driving unit control portion 159, the motor 26a of the move driving unit 26 is connected with the move driving unit control portion 160, the motor 32a of the nut driving unit 32 is connected with the nut driving unit control portion 161, the motor 36a of the rotation driving unit 36 is connected with the C-axis driving control portion 162, the driving motor 49 of each head unit 45 is connected with the B-axis driving control portion 163, the motor 52a in the slide driving unit 52 of each head unit 45 is connected with the A-axis driving control portion 165 and the valve driving unit 66 for driving the valve 65 provided with the pressure transfer member 62 with respect to each pad 57 is connected with the absorption control portion 166. And, the cable 113a from the machining.classification program composing unit 101 side is connected with the communication control portion 153. A parts classification unit 15, capable of absorbing, carrying and classifying the parts 70, is comprised of the guide rail 11, the palletizing robot 20, a part of the machining.classification program composing unit 101, a part of the laser beam machining equipment control unit 150, described before.

In order to machine the sheet workpiece 70A in the laser beam machining equipment 1 comprised as explained before and to classify the parts 70 made by the machining with the parts classification unit 15, it is necessary to compose a machining.classification program KSP for controlling such machining and classification by the machining.classification program composing unit 101. The composing procedures of the machining.classification program KSP with this machining.classification program composing unit 101 will now be explained hereinafter.

Figure 17:
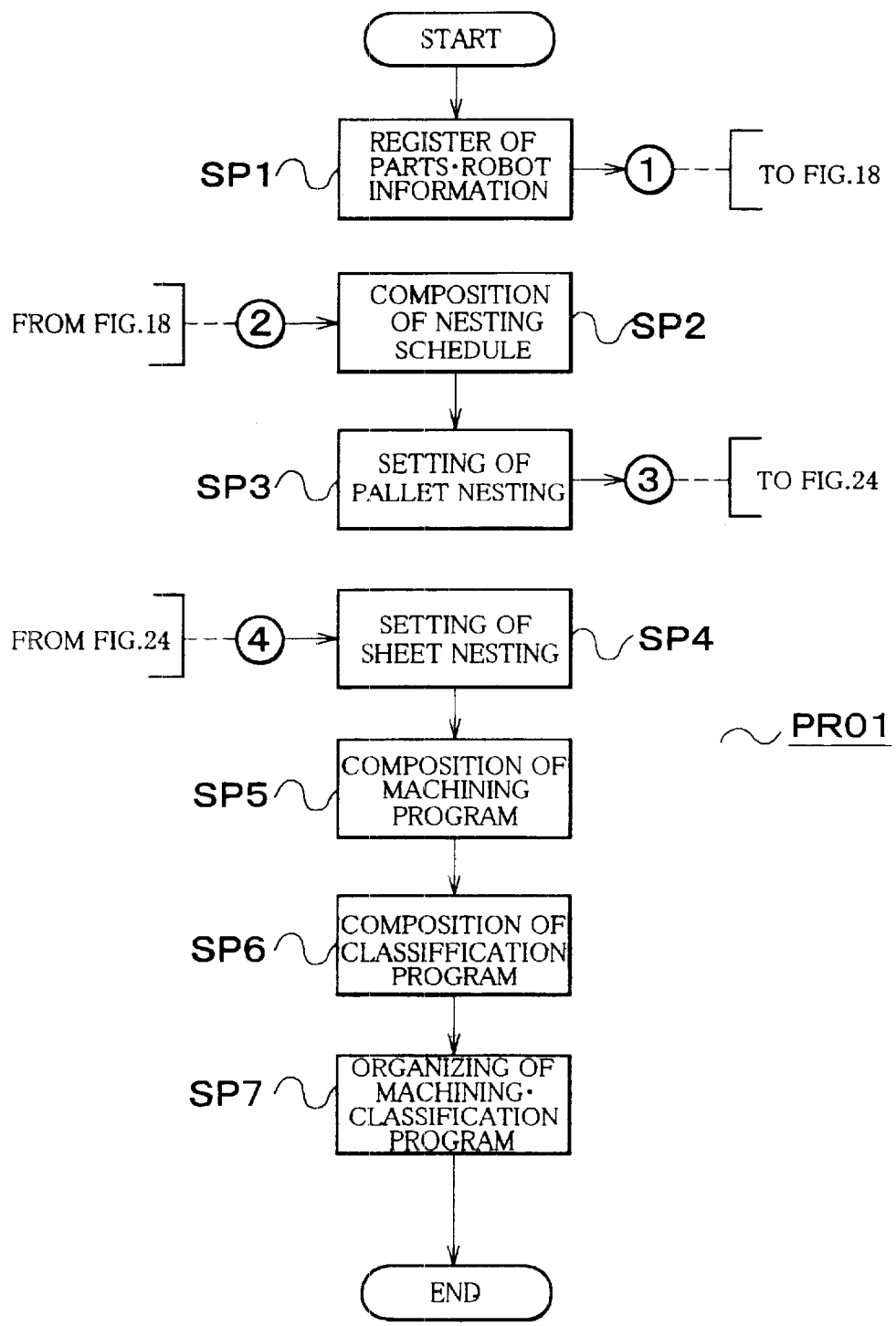
FIG. 17 is a flowchart showing a programming program.

At first, an operator inputs the command of composing the machining.classification program through the keyboard 103a. The main control portion 102 receiving this command proceeds with reading procedure from the program memory 107 on the basis of a programming program PRO1, as shown in FIG. 17.

The register of the parts.robot information is executed as a first step SP1. Parts.robot information BRJ to be registered at this time is the information comprised of parts information BJ concerning respective kinds of the parts 70 made by cutting and machining (material, form, dimension or the like) and position information of the palletizing robot 20 with respect to the parts 70 when the parts 70 is absorbed and carried, and one parts.robot information BRJ is registered for each kind of the parts 70. Then, when the same kind of a plurality of parts 70 are machined, for instance, only one part.robot information BRJ may be registered concerning this kind of the parts 70. That is, the main control portion 102 reads out a first sub-program SPR1 stored in the program memory 107 so as to have the parts.robot information register control portion 115 execute. The parts.robot information register control portion 115 becomes to be the input mode of the parts information capable of inputting the parts information BJ. And, for instance, in the present embodiment, the input scope as shown in FIG. 19 (the parts name, parts form or the like are not already input at this time) is displayed on the display 105 through the image control portion 106.

Figure 19:
FIG. 19 is a view showing display contents on a display in parts information input mode.
Figure 20:
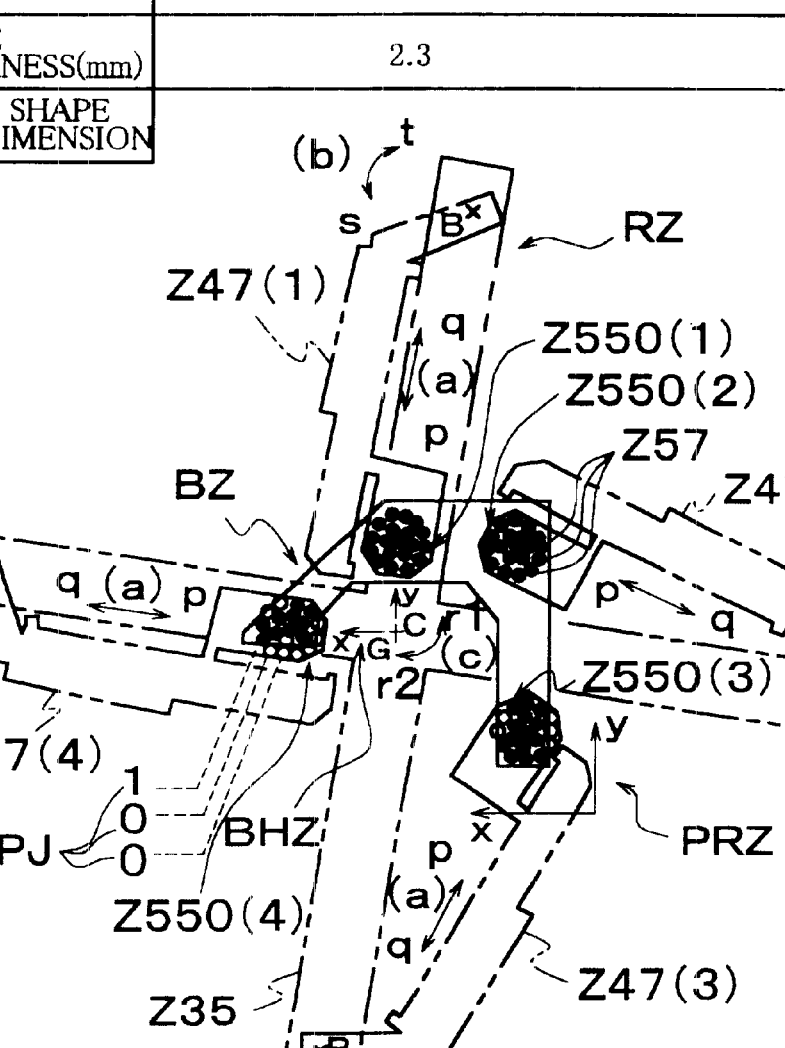
FIG. 20 is a view showing display contents on a display displayed parts information and robot graphic.

An operator watching the display 105 inputs the first kind of the part information BJ (that is, the data of "parts name Bm ("sort 3", for instance)" "material Zs ("SPCC", for instance)" "plate thickness Ia ("2.3 (mm)", for instance)" through the keyboard 103a), as shown in FIG. 19, for instance. The input values Bm, Zs and Ia are input in the input.display memory 110, and is displayed on the display 105 through the image control portion 106, as shown in FIG. 20. On the other hand, the graphic control portion 112, which constructs graphic information on a predetermined program coordinates PRZ (x-y coordinates) in the input.display memory 110 so as to link a mouse operation by a well-known plotter program in a CAD or the like and displays the constructed graphic information on the display 105 in order, operates. Then, an operator inputs a parts graphic BZ including the machining form of the parts 70, its dimension and the like by operating the mouse 103b through the graphic control portion 112. The constructed parts graphic BZ is displayed on the display 105, as shown in FIG. 19. And, numerals attached to the parts graphic BZ in the figure show the dimension (mm) of the corresponding side. On this occasion, the graphic control portion 112 computes the x and y coordinate positions on the program coordinates PRZ of gravity G of the parts graphic BZ from the graphic information of the input parts graphic BZ, and locates the gravity G together with the parts graphic BZ on the program coordinates PRZ so as to display on the display 105.

When the input of the parts information BJ comprised of the respective values Bm, Zs and Ia and the parts graphic BZ is finished and an operator inputs a parts information input finish signal through the keyboard 103a, the parts.robot information register control portion 115 acknowledges the finish of the input of the parts information on the basis of the signal (step STP2 of FIG. 18) so as to instruct the graphic control portion 112 to locate a robot graphic RZ which is the graphic showing the palletizing robot 20 (step STP3) The graphic control portion 112 receiving this locates the robot graphic RZ of the palletizing robot 20 which it 112 has been retaining in advance (but, this graphic RZ is the upper face figure briefly showing the suspension frame 35, the four arms 47 and the absorption head aggregate 550 of each arm 47) on the above-mentioned program coordinates PRZ of the input.display memory 110 as shown in FIG. 20 with the same magnification as the parts graphic BZ so as to display on the display 105 (In FIG. 20, the dimension of each side of the parts graphic BZ is omitted, for simplification.). On this occasion, the location of the robot graphic RZ on the program coordinates PRZ is executed so as to correspond the C-axis (corresponds to a rotational axis CT1 in the palletizing robot 20, and is shown by a mark "C" in FIG. 20) of the robot graphic RZ with the gravity G of the parts graphic BZ.

This robot graphic RZ is movable on the program coordinates PRZ by the graphic movement control with the graphic control portion 112 linking the mouse operation, in a similar way to the operation pattern of the actual palletizing robot 20. For instance, the whole robot graphic RZ is movable in the x-axis direction and in the y-axis direction on the program coordinates PRZ, a suspension frame graphic Z35 (corresponds to the suspension frame 35 of the machine) is rotatable and movable in the direction as shown by the arrows r1 and r2 (the c-axis direction corresponding to the C-axis direction of the machine) in FIG. 20 with the C-axis as its center, each arm graphic Z47 (corresponding to the arm 47 of the machine) is rotatable and movable in the direction as shown by the arrows s and t of FIG. 20 (the b-axis direction corresponding to the B-axis direction of the machine) with the B-axis (corresponds to a rotational axis CT2 of the machine and is shown by the mark "B" in FIG. 20) which is the rotational center set with the suspension frame graphic Z35 as its center, and each absorption head aggregate graphic Z550 (corresponding to the absorption head aggregate 550 of the machine) is slidable and movable in the direction as shown by the arrows p and q of FIG. 20 (a-axis direction corresponding to the A-axis direction of the machine) along each arm graphic Z47. Then, an operator moves the whole robot graphic RZ on the program coordinates PRZ by the mouse operation, or rotates and moves the suspension frame graphic Z35 in the c-axis direction of FIG. 20, and rotates and moves each arm graphic Z47 in the b-axis direction of FIG. 20, and slidably moves each absorption head aggregate graphic Z550 in the a-axis direction of FIG. 20 so as to position the robot graphic RZ with respect to the parts graphic BZ, watching the display 105 of FIG. 20. This positioning is executed so as to appropriately locate each absorption head aggregate graphic Z550 on the parts graphic BZ, as shown in FIG. 20. That is, by this positioning, the palletizing robot 20 is positioned with respect to the parts 70 when the parts 70 is absorbed and carried with the palletizing robot 20. Although this positioning can be executed as mentioned before by moving the whole robot graphic RZ on the program coordinates PRZ in the x-axis direction and in the y-axis direction, in fact, the position of the robot graphic RZ with respect to the parts graphic BZ may not change from the state that the C-axis and the gravity G of the parts graphic BZ correspond to each other (first value of the location of the robot graphic RZ on the program coordinates PRZ). This is because in such a state that the C-axis and the gravity G of the part graphic BZ correspond to each other, the gravity of the parts 70 positions at the position of the rotational axis CT1 which is the central axis of the suspension frame 35 in the actual absorption and carry, and the state is very stable in the balance. Accordingly, it is not necessary to move the whole robot graphic RZ in the x-axis direction and in the y-axis direction of the program coordinates PRZ at the time of positioning of the robot graphic RZ, different from the present embodiment, by setting the first value of the location of the robot graphic RZ on the program coordinates PRZ so as to correspond the C-axis and the gravity G of the parts graphic BZ to each other, so it is very convenient without much labor.

When the positioning of the robot graphic RZ is finished and a positioning finish signal is input by an operator through the keyboard 103a, the parts.robot information register control portion 115 acknowledges the finish of the positioning of the robot graphic RZ on the basis of the signal (step STP4 of FIG. 18) so as to instruct the effective pad detecting portion 116 to detect the effective pad graphic Z57 of each pad graphic Z57 (corresponds to the pad 57 of the machine)of each absorption head aggregate graphic Z550 in the robot graphic RZ (step STP5). This means that, such an actual state that the positioning of the robot graphic RZ with respect to the parts graphic BZ is executed between the palletizing robot 20 and the parts 70 is considered and in this state, the effective pad 57 in each absorption head aggregate 550 (the pad 57 positioning on the parts 70 so as to appropriately exercise the absorption force on the parts 70) is detected. The effective pad detecting portion 116 receiving the instruction of the detection of the effective pad graphic Z57 detects the graphic inside area (the portion corresponding to its surface in the actual parts 70) in the parts graphic BZ on the program coordinates PRZ at first, and then, judges as to whether each pad graphic Z57 is completely in the graphic inside area concerning all of the pad graphics Z57 of the four absorption head aggregate graphic Z550, or is out of the graphic inside area (including the case where a part of the pad graphic Z57 is out of the graphic inside area as well as the case where the pad graphic Z57 is completely out of the graphic inside area). In case where the pad graphic Z57 is completely in the graphic inside area, the pad 57 is appropriately located on the surface of the parts 70 so as to appropriately exercise the absorption force on the parts 70 by the reducing pressure in the pad 57 when the palletizing robot 20 is actually positioned on the parts 70. Besides, in case where the pad graphic Z57 is out of the graphic inside area, the pad 57 is located, shifting from the surface of the parts 70, then the absorption force can not be appropriately exercised on the parts 70 by the pad 57 when the palletizing robot 20 is actually positioned on the parts 70. As shown in FIG. 20, the effective pad detecting portion 116 detects the pad graphic Z57 which is completely in the graphic inside area as "an effective pad" as the result of this judgement, and stores the value of pad information PJ "1 (effective)". The pad information PJ which value is "0" is stored concerning the another (that is, ineffective) pad graphics Z57. Besides, in FIG. 20 of the present embodiment, identification indications are attached, for instance, in the case where the pad information PJ is "1", ● is shown, and in case of "0", ○ is shown for easy understanding on the display 105.

As explained heretofore, in the present embodiment, the case where the palletizing robot 20 is actually positioned on the parts 70 is considered in the machining.classification program composing unit 101, the pad 57 appropriately positioning on the surface of the parts 70 is detected at this positioning time, and the pad information PJ which is the above-mentioned information can be obtained. At the actual time of absorption and carry, many pads 57 can be selectively on-off controlled, appropriately exercising the absorption force on the parts 70 by the machining.classification program KSP using the pad information PJ. By doing so, complex operations, such as the operation of on-off setting of the pad, confirming the position between the parts and the pad by an worker at the carry site, can be omitted, different from a conventional way. Besides, such a mistake that the pad out of the parts is set as "on" in error, can be avoided, so the credibility is high.

Subsequently, the parts.robot information register control portion 115 instructs the parts weight computing portion 117 and the carriable weight computing portion 119 to obtain parts weight Bw and carriable weight Hw (step STP6 in FIG. 18). The parts weight computing portion 117 receiving this computes the parts weight Bw which is the weight of the parts 70, at first. That is, the parts weight computing portion 117 obtains volume Va of the parts 70 from the form (the graphic information of the parts graphic BZ) and the plate thickness Ia of the parts 70 input in the input.display memory 110, and detects the density of the parts 70 from the material Zs of the parts 70 input in the input.display memory 110 on the basis of material.density table ZMF (FIG. 21) stored in advance in the material.density table memory 117a, and computes the parts weight Bw of the parts 70 from these volume and density. For instance, the volume Va (mm$^3$) of the parts 70 in the instance as shown in FIG. 20 is $Va$=surface area(mm$^3$)×plate thickness $Ia$(mm)=52,043.5×2.3=119,700=1.197×10$^{-4}$ (m$^3$).

Since the material Zs of the parts 70 is "SPCC", from the above-mentioned values and FIG. 21, the parts weight Bw (kg) is $Bw$=volume $Va$(m$^3$)×density(kg/m$^3$)=1.197×10$^{-4}$×6500=0.778 (kg).

On the other hand, the carriable weight computing portion 119 detects the number which value is "1" of the pad information PJ input in the input.display memory 110 (the number is 62 in the present embodiment), and integrates the absorbable weight by one pad 57 (which is already known value, for instance, 1.3 kg). If the result is the carriable weight Hw, $Hw$=1.3 (kg)×62(number)=80.6 (kg).

That is, if actual absorption is executed the same as the pad information PJ input in the present input.display memory 110, the limit of the weight capable of absorbing and carrying is 80.6 kg. The parts weight Bw and the carriable weight Hw computed in this way are transferred to the weight judging portion 120 so as to judge the weight. That is, the weight judging portion 120 calculates the value of (the parts weight Bw)/(the carriable weight Hw)=α so as to judge as to whether 0.1<α<1 (step STP7 of FIG. 18). That is, α<1 means that the parts weight Bw is smaller than the carriable weight Hw, and the parts 70 can be carried by absorption. α>0.1 means that the parts weight Bw is bigger than 10% of the carriable weight Hw (this value can be set by an optional value if it is bigger than 0 and smaller than 1), and the carriable weight Hw is not too big in comparison with the parts weight Bw. The reason why as to whether the carriable weight Hw is not too big in comparison with the parts weight Bw is checked is that the parts 70 is hard to remove from the pad 57 and the parts 70 is in danger of being shifted and damaged with high provability if the carriable weight Hw is too big in comparison with the parts weight Bw although the shift or damage of the parts can be prevented in advance if the parts 70 is immediately removed from the pad 57 before acting a strong force on the parts 70 when the parts 70 to be absorbed and carried catches a sheet workpiece, for instance. When 0.1<α<1, and there is no problem in the weight, the judgement result output portion 121 proceeds with the following step STP8 as shown in FIG. 18 without specially displaying on the display 105 or the like. The display "warning" having contents that there is a problem is shown (not shown) as well as the number of the appropriate absorption pad only when there is a problem.

Figure 18:
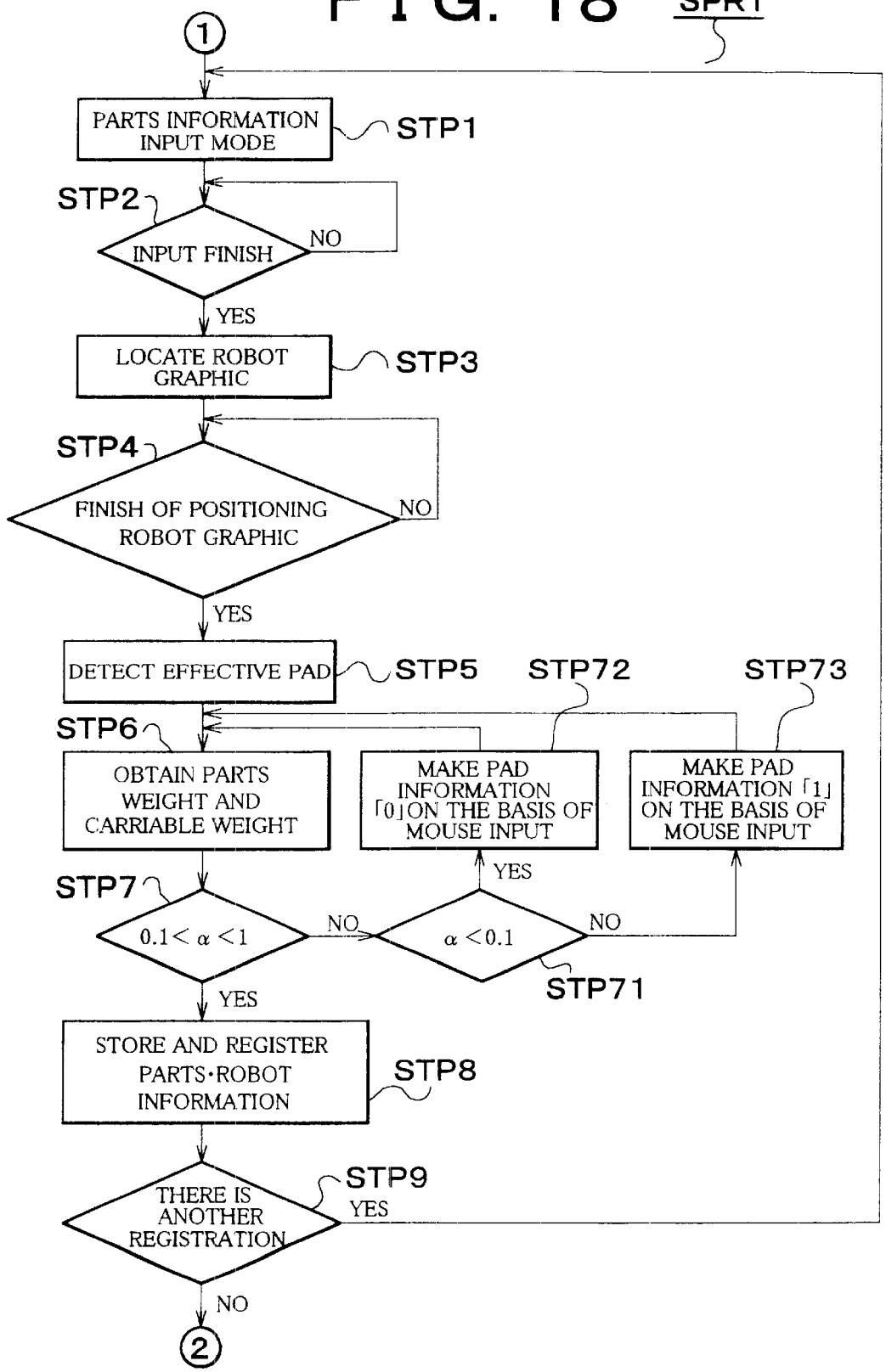
FIG. 18 is a flowchart showing a first sub-program.

In case as shown in FIG. 20, the parts weight Bw=0.778 (kg) and the carriable weight Hw=80.6 (kg), α=0.778÷80.6= 0.0096 . . . , and the judgement is that 0.1<α<1 does not applies in the step STP7 of FIG. 18 so as to proceed with the step STP71. In this step STP71, the weight judging portion 120 judges whether α≦0.1 or not. That is, if α≦0.1, it means that the parts weight Bw is smaller than the carriable weight Hw 10%, and it is necessary to make the carriable weight Hw small. Since α=0.0096 . . . ≦0.1 in the case as shown in FIG. 20, the judgement result output portion 121 outputs the contents "make the carriable weight small" (not shown) so as to display on the display 105 through the image control portion 106. An operator watching this display executes such an operation that the pad which pad information PJ is effective "1" at the present is made ineffective in order to make the carriable weight Hw small. That is, an operator specifies and inputs the pad graphic Z57 which pad information PJ is wanted to be made ineffective "0" by a mouse operation. The graphic control portion 112 receives a signal by this specified input and changes the pad information PJ of the pad graphic Z57 from effective "1" into ineffective "0" in the input.display memory 110 (step STP72 of FIG. 18). In the case as shown in FIG. 20, the pad information PJ of the pad graphic Z57 with respect to 57 numbers of the pads 57, for instance, of the pad information PJ of the pad graphic Z57 with respect to 62 numbers of the pads 57 which were effective "1" is made ineffective "0" (illustration is omitted). When the step STP72 finishes in this way, the program enters into the step STP6, again a shown in FIG. 18, and furthermore enters into the step STP7 so as to judge as to whether $0.1<\alpha<1$ by the weight judging portion 120. Since the pad information PJ of the 57 numbers of the pad graphic Z57 is made ineffective "0" in the above-mentioned instance, in the result, only pad information PJ of 5 numbers of the pad graphic Z57 is effective "1", the carriable weight Hw is 1.3 (kg)×5 (number)=6.5 (kg), and α is 0.778÷6.5=0.1197 . . . Then, $0.1<\alpha<1$ is judged in the step STP7, and the program proceeds with the step STP8 (When the number of the pads 57 which are made ineffective "0" by the mouse input in the step STP72 of FIG. 18 is small, the value of α is not sufficient big and the judgement is not $0.1<\alpha<1$ in the step STP7, for instance, the program proceeds with the steps STP71, STP72, STP6 . . . , again.) But, since appropriate pad number is displayed on the display 105 as well as alarm, it is not necessary to repeat this loop many times if this value is accepted.

When the judgement is not $0.1<\alpha<1$ in the step STP7 of FIG. 18 so as to proceed with the step STP71 and the judgement is not $\alpha<0.1$ but $\alpha>1$ in the step STP71, the judgement result output portion 121 outputs the contents "make the carriable weight bigger" as well as the appropriate pad number so as to display on the display 105 (not shown) through the image control portion 106, and the program returns the step STP6 passing through the step STP73. That is, this case means that it is necessary to make the carriable weight Hw bigger since the parts weight Bw is bigger than the carriable weight Hw and the parts 70 can not be absorbed and carried as it is. An operator makes more pad graphic Z57 effective on the parts graphic BZ by a mouse operation, watching the display 105 (the step STP73) When redetermination of the pad information in the robot graphic RZ is finished in this way, the program enters into the step STP7 from the step STP6 in a similar routines as mentioned. Since more of the pad graphic Z57 is made effective on the parts graphic BZ in this way and the number of the pad graphic Z57 which pad information PJ is effective "1" increases, the judgement is $0.1<\alpha<1$ by making the value of α smaller in the step STP7 so as to enter into the following step STP8 (in case where the value of α is not sufficiently made small, the program proceeds with the steps STP71, STP73, STP6 . . . , again).

In the present embodiment in this way, it is supposed the parts 70 is actually absorbed by the palletizing robot 20 through the machining.classification program composing unit 101, the parts weight Bw and the carriable weight Hw are computed when this absorption is executed, and as to whether or not the sizes of the parts weight Bw and the carriable weight Hw fit absorption and carrying of the parts 70, that is, whether or not $0.1<\alpha<1$ is judged in the instance above-mentioned so as to check by the weight judging portion 120. By doing so, at the time of the actual absorption and carrying, such problems that the parts weight Bw of the parts 70 is too big to absorb and carry or the parts weight Bw is too small in comparison with the carriable weight Hw so as to be dangerous (the danger when the parts 70 to be absorbed and carried catches a sheet workpiece, as mentioned above) are prevented, then it's convenient.

When the program enters in the step STP8 passing through the step STP7 in this way, the parts.robot information register control portion 115 stores the positioning information of the robot graphic RZ with respect to the parts information BJ and the parts graphic BZ having the contents the same as ones shown in FIG. 20 input in the input.display memory 110 in the parts.robot information memory 122 as parts.robot information BRJ so as to register. The storage style of this parts.robot information BRJ is shown in FIG. 22, for instance. That is, as shown in FIG. 22, the parts.robot information BRJ stored and registered has parts form information Bk showing the parts name Bm, the material Za, the plate thickness Ia, the parts weight Bw and the dimension or shape of the parts (since the storage style of the material, plate thickness, parts weight, parts shape information is similar to the prior art, it is not shown.) as a value (these to this point are the part corresponding to the parts information BJ). On this occasion, the parts graphic BZ and the robot graphic RZ input in the input.display memory 110 is the information on the above-mentioned program coordinates PRZ. But, when these graphic information is stored and registered as the parts.robot information BRJ, the parts.robot information register control portion 115 newly sets parts coordinates BHZ (x-y coordinates as shown in FIG. 20) which origin is the gravity G of the parts graphic BZ so as to store and register by converting into the graphic information on the parts coordinates BHZ (but, the gravity G of the parts graphic BZ is not always an origin). Then, the parts form information Bk is the information on the parts coordinates BHZ set on the parts 70 in the storage style as shown in FIG. 22. Furthermore, the parts.robot information BRJ as shown in FIG. 22 has the positioning information of the robot graphic RZ and the like, and this has the x coordinates position of the C-axis of the robot graphic RZ in the parts coordinates BHZ (mark "x" in FIG. 22) and the y coordinates position (mark "y" in FIG. 22), the rotational angle in the c-axis direction of the suspension frame graphic Z35 (mark "c" in FIG. 22, then, the direction as shown by the arrow r2 as shown in FIG. 20 is positive direction), the respective rotational angles of the four arm graphic Z47 in the b-axis direction (as shown by the marks "b1, b2, b3, b4" in FIG. 22, then, the direction as shown by the arrow s as shown in FIG. 20 is the positive direction) the respective positions of each absorption head aggregate graphic Z550 in the a-axis direction (as shown by the marks "a1, a2, a3, a4" in FIG. 22, then, the direction as shown by the arrow q is the positive direction in FIG. 20) and the pad information PJ in each absorption head aggregate graphic Z550 (as shown by the marks "j1, j2, j3, j4" in FIG. 22 for every group concerning each absorption head aggregate graphic Z550). The marks b1, b2 . . . , a1, a2, . . . j1, j2 . . . in FIG. 22 will now be explained hereinafter. In FIG. 20, numbers (1), (2), (3), (4) are entered after the mark Z47 (that is, Z47 (1), Z47 (2), Z47 (3), Z47 (4)) in the figure in the clockwise order from the arm graphic on the upper side of the paper in order to differentiate the arm graphic Z47 from one another (Since each arm graphic Z47 corresponds to the arm 47 of the actual palletizing robot 20 of FIG. 5 with one to one, the arm 47(1), 47 (2), 47(3), 47 (4) are shown). That is, the rotational angle showing by the marks b1, b2, b3, b4 in FIG. 22 is one concerning the arm graphic Z47(1), Z47(2), Z47(3), Z47(4) in order. Besides, in FIG. 20, the absorption head aggregate graphic Z550(1), Z550(2), Z550(3), Z550(4) are entered, the same as the numbers (1), (2), (3), (4) of the arm graphic Z47, with which each absorption head aggregate graphic Z550 is provided, in order to differentiate the absorption head aggregate Z550 from one another (since each absorption head aggregate graphic Z550 corresponds to the absorption head aggregate 550 of the palletizing robot 20 of the machine with one to one, the absorption head aggregate 550(1), 550(2), 550(3), 550(4) are shown).

That is, the positions shown by the marks a1, a2, a3, a4 in FIG. 22 are ones concerning the absorption head aggregate graphic Z550(1), Z550(2), Z550(3), Z550(4) in order. And, each absorption head aggregate graphic Z550 has 19 of pad graphic PZ, as shown in FIG. 20, these pad graphic Z57 is differentiated from one another, and then Z57(1), Z57(2), Z57(3), . . . Z57(19) are shown (omitted in FIG. 20). Since each pad 57 in the palletizing robot 20 of the machine corresponds to each pad graphic Z57 with one to one, the pads 57(1), 57(2), . . . , 57(19) are entered when respective pads 57 are differentiated from one another in each absorption head aggregate 550. That is, the marks j1, j2, j3, j4 in FIG. 22 are the group of the pad information PJ corresponding to the absorption head aggregate graphic Z550(1), Z550 (2), Z550 (3), Z550(4) in order, and the 19 values in each group are the pad information PJ concerning the pad graphic Z57 (1), Z57(2), . . . , Z57(19) in order. The value of the pad information PJ concerning each pad graphic Z57 is "1 (effective)" or "0 (ineffective)".

Subsequently, the parts.robot information register control portion 115 displays the message (not shown) as to whether or not the parts.robot information BRJ concerning another kind of the parts 70 is registered on the display 105 through the image control portion 106. Furthermore, if it is necessary to register the parts.robot information BRJ and the parts.robot information register control portion 115 judges that another parts.robot information should be registered by inputting a signal of register continuation by an operator through the keyboard 103*a* (the step STP9 of FIG. 18) the program returns to the first step STP1. By executing the steps STP1 through STP9 in a similar way above-mentioned, the input of the parts information BJ, the positioning of the robot graphic RZ with respect to the input parts graphic BZ, the setting of the pad information PJ concerning another kind of the parts 70 are executed, and the parts.robot information BRJ is registered as shown in FIG. 22. Further subsequently, the register of the parts.robot information BRJ is executed by executing the steps STP1 through STP9 concerning further another kind of the parts 70 in order so as to finish the register concerning all kind of the parts 70 in the shape of the parts name Bm (for instance, "sort 3" or "sort 4", . . . ) as shown in FIG. 22. On this occasion, in the step STP9 concerning the parts 70 which register is lastly finished as shown in FIG. 18, the parts.robot information register control portion 115 judges further another parts.robot information BRJ is not registered so as to finish the first sub-program SPR1. Then, all of the operations in the step STP1 is finished.

In the step SP1 in the present embodiment, the register of the parts.robot information BRJ concerning the parts name Bm which is the parts 70 in the same sheet workpiece 70A is continuously executed. By dosing so, the value the same as one input last time may be input at the time of input of the parts information BJ, such as "material" or "plate thickness". Then, input operation is smoothly advanced, it's very convenient. Besides, since the position information at the time of absorption and carrying of the palletizing robot 20 with respect to each parts 70 is registered as the parts.robot information BRJ at the time of composing of the machining.classification program KSP in the present embodiment, teaching is not necessary at the time of actual absorption and carrying, so it's convenient. And, since the register of the parts.robot information BRJ may be executed every each kind, but not every parts 70, the register of the parts.robot information BRJ can be simply executed in a short time. The classification program SPR every parts 70 is composed, making use of the parts.robot information BRJ of every each kind in the step SP6 described hereinafter. Accordingly, the operation time is widely shortened and the operation can be made simple in comparison with the conventional teaching.

Figure 23:
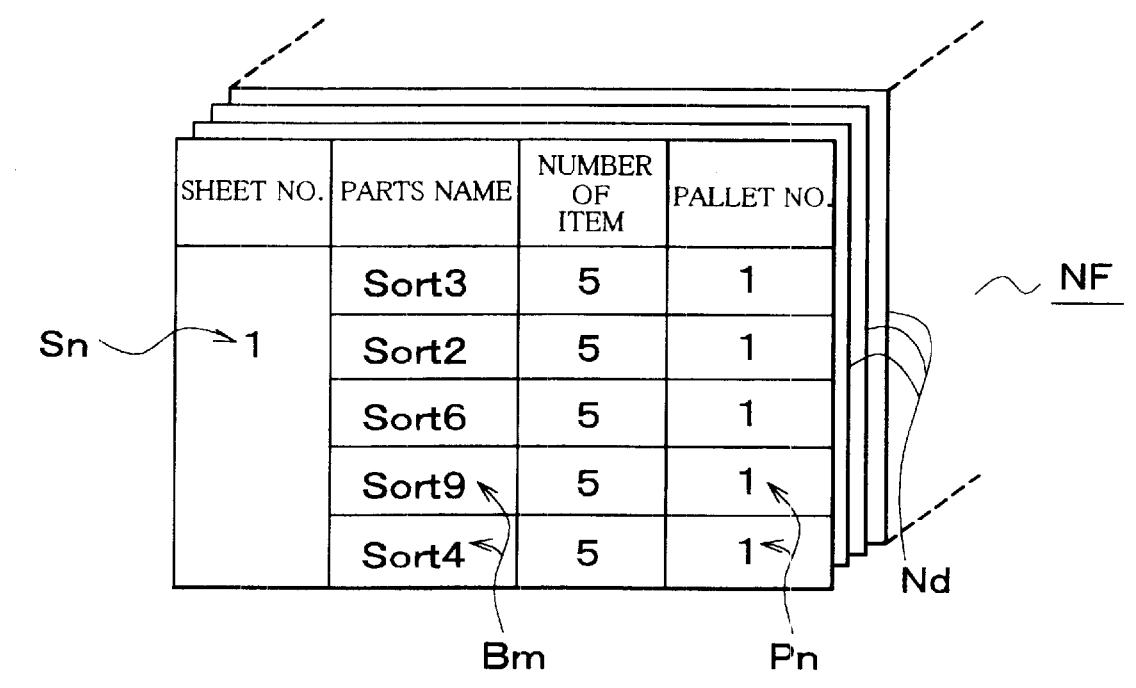

Thereafter, the main control portion 102 proceeds with the step SP2 as shown in FIG. 17, and have the nesting schedule composing portion 109 compose the nesting schedule. This composing of the nesting schedule is executed in such a manner that the nesting schedule composing portion 109 composes nesting schedule file NF on the basis of the input by an operator so as to store in the nesting schedule memory 109*a,* and is executed in a similar way to a conventional nesting schedule composing method. For instance, the nesting schedule file NF is composed as shown in FIG. 23 in the present embodiment, and this file has a plurality of nesting schedule data Nd composed every sheet workpiece 70A to be machined. As shown in FIG. 23, each nesting data Nd includes "sheet No." which is the sheet number Sn for differentiating the sheet workpiece 70A ("1" in the nesting data Nd as shown in FIG. 23, "parts name" which is the kind of the parts 70 taken out from the sheet workpiece 70A (corresponds to the parts name Bm of the above-mentioned parts.robot information BRJ, such as "sort 3", "sort 2", . . . "sort 4" and the like), "number of items" of respective kinds of the parts 70 to be taken out (5 in any of "sort 3" , "sort 2", . . . , "sort 4" as shown in FIG. 23), and "pallet No." which is the pallet number Pn of the pallet 10 for starting nesting when nesting is executed on the respective kinds of the parts 70. In the present embodiment, the pallet 10 is eight, and "pallet No. " is 1 through 8. But, "sort 3", "sort 2", . . . "sort 4" as shown in FIG. 23 is all "1". Then, nesting is executed from the pallet 10 of "pallet No. 1", and is executed on the following pallet 10 such as "pallet Nos.2, 3, 4 . . . " in order when the nesting of the parts 70 can not be executed on the pallet 10 of "pallet No. 1". Then, the step SP2 is finished.

Figure 24:
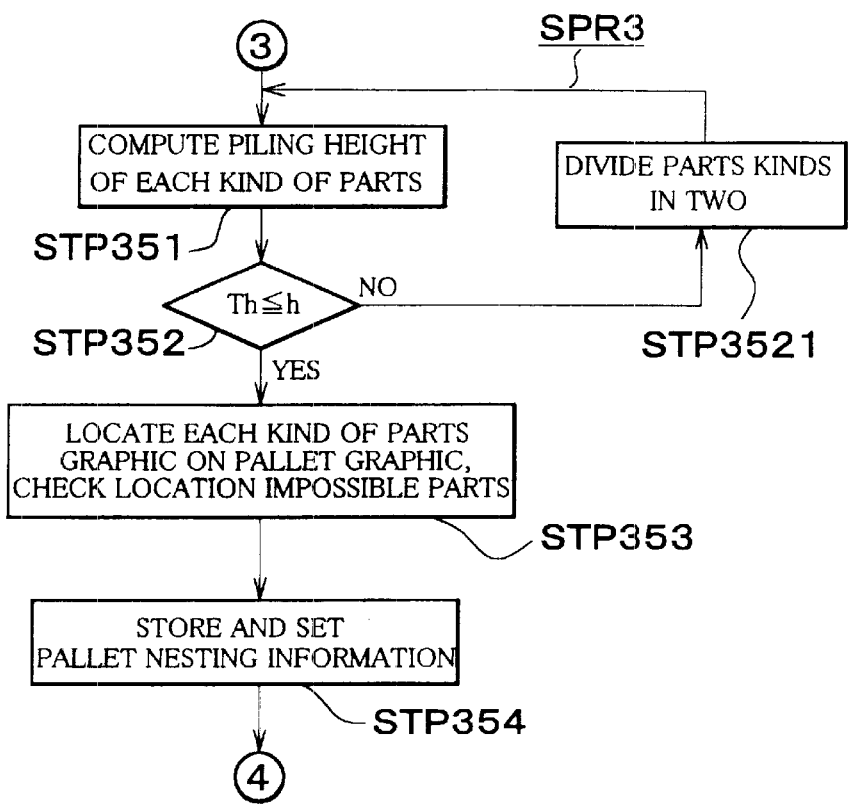
FIG. 24 is a flowchart showing a third sub-program.

Thereafter, the main control portion 102 proceeds with the step SP3 as shown in FIG. 17 so as to set the pallet nesting. In SP3, the main control portion 102 reads out the third sub-program SPR3 stored in the program memory 107 at first so as to have the pallet setting portion 130 execute. The pallet nesting setting portion 130 receiving this enters into the step STP351 on the basis of the third sub-program SPR3 as shown in FIG. 24. In this step STP351, piling height Th concerning the respective kinds of the parts graphic BZ is composed. That is, since the same kind of the parts 70 is basically classified by piling on the pallet 10 on the upper hand, the piling height at this time is the piling height Th. That is, the piling height computing portion 133 detects the plate thickness Ia of respective kinds of the parts 70 from the parts.robot information BRJ stored in the parts.robot information memory 122, and detects the number of the respective kinds of the parts 70 from the nesting schedule file NF (FIG. 23) stored in the nesting schedule memory 109*a.*

Subsequently, the piling height computing portion 133 computes the piling height Th every respective kinds of the parts 70 by multiplying the plate thickness Ia by the number detected as described before. For instance, in case where the parts name Bm is the parts 70 of "sort 3", the piling height Th is 2.3×5=11.5 (mm) since the plate thickness Ia is 2.3 (mm) from FIG. 20 and the number of items is 5 from FIG. 23. Thereafter, the piling height judging portion 135 compares the piling height Th computed every each kind of the parts 70 and the predetermined piling limited height h in the pallet 10 with each other (the step STP352 of FIG. 24). In result, if T h≦h in any parts 70, the program proceeds with the following step STP353. If this limited height h is 300 mm, for instance, it makes T h≦h since the piling height Th concerning the above-mentioned "sort 3" is 11.5 mm. And, in case where Th>h, the program proceeds with the step STP3521 so as to divide the kinds of the parts 70 into two, for convenience. That is, the parts kind provisional setting portion 136 divides the parts 70 of the kind of Th>h into almost half number and provisionally sets respective divided parts 70 as different kind of parts 70. But, this provisional setting concerning kind is effective only in the steps STP351 through STP353 of the step SP3. If Th>h concerning the parts 70 of "sort 4" (number is 5 from FIG. 23), for instance, "sort 4" is divided into two kinds, that is, "sort 4.1" (3 items) and "sort 4.2" (2 items) by the parts kind provisional setting portion 136. When the step STP3521 finishes, the program returns to the step STP351, as shown in FIG. 24, the piling height Th of these parts 70 is computed, and the piling height Th and the piling limited height h are compared with each other in respective kinds of the parts 70 in the step STP352. Concerning the parts 70 which Th>h in the last step STP352, the kinds are conveniently divided into two in the step STP3521 and are located so as to compute provided that they are piled on the different positions on the pallet 10, and the piling height Th is almost half of the value lastly computed. Accordingly, Th≦h in the step STP352 at this time, then the program proceeds with the step STP353. In case where there is the parts 70 which still Th>h, the steps STP3521, STP351, STP352 are executed, again, in a similar way to the above-mentioned routines.

Figure 25:
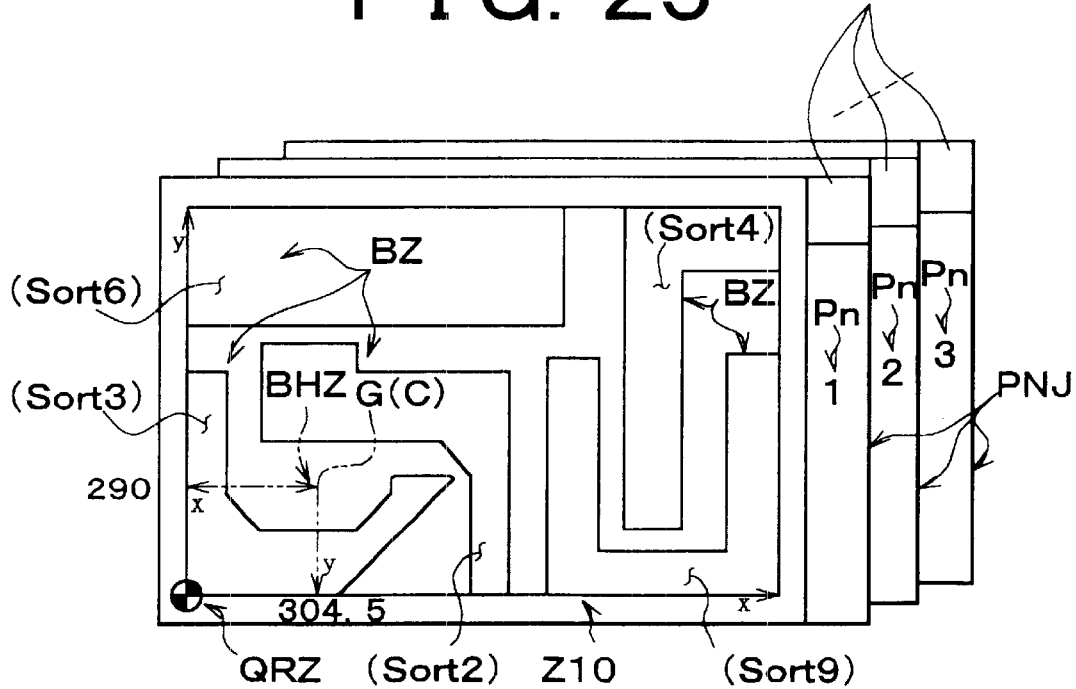
FIG. 25 is a view showing display contents on the display at the time of pallet nesting setting.

When the program enters into the step STP353 from the step STP352 in this way, the respective kinds of the parts graphic is located on the pallet graphic and the location impossible parts is checked as the step STP353 of FIG. 24. Firstly, the pallet nesting setting portion 130 instructs the graphic control portion 112 to set the pallet coordinates QRZ, and the graphic control portion 112 receiving this locates and sets the predetermined pallet coordinates QRZ (x-y coordinates) in the input.display memory 110 as shown in FIG. 25 (FIG. 25 is the display contents in the display 105, and is the same as the information contents in the input.display memory 110) so as to locate the pallet graphic Z10 corresponding to the actual parts classification area of the pallet 10 on the pallet coordinates QRZ. Since the pallet 10 has "pallet Nos.1 through 8" in the present embodiment, 8 pallet coordinates QRZ and 8 pallet graphic Z10 corresponding to the pallet coordinates QRZ are located in the input-.display memory 110, as shown in FIG. 25. The pallet graphic Z10, the pallet coordinates QRZ, the parts graphic BZ on the pallet coordinates QRZ, described hereinafter, are displayed on the display 105. On each pallet graphic Z10, the information of the actual pallet numbers Pn of the pallet 10 corresponding to this is affixed, and on the display 105, "1", "2", "3 . . . " are shown on the positions of "pallet No", as shown in FIG. 25. Subsequently, the graphic location portion 131 reads out all of the parts.robot information BRJ registered from the parts.robot information memory 122, the parts graphic BZ which is a part of the read out parts.robot information BRJ, concerning the respective kinds of the parts 70 (the parts dealt with as the different kind of the parts for convenience in the step 3521 is dealt with as the different kind) is located on the pallet graphic Z10 of each pallet coordinates QRZ, by the same scale as the pallet graphic Z10, as shown in FIG. 25. At the time of this location, the graphic location portion 131 detects the pallet number Pn (for instance, "sort 3", "sort 2", . . . is "pallet No. 1")of the pallet 10 on which the parts graphic BZ is nested with respect to each parts graphic BZ on the basis of the nesting schedule file NF (FIG. 23) stored in the nesting schedule memory 109a, and by doing so, the location in the pallet graphic Z10 of the parts graphic BZ is executed on the pallet graphic Z10 having the detected pallet number Pn. For instance, the parts graphic BZ of "sort 3", "sort 2", . . . as shown in FIG. 25 is obtained by nesting the pallet graphic Z10 of "pallet No. 1". For easy understanding, the parts name Bm is shown as (sort3), (sort2) . . . with respect to each parts graphic BZ in FIG. 25. The graphic location by the graphic location portion 131 is well-known graphic procedure. But, in the concrete, the respective kinds of the parts graphic BZ is located so as not to overlap these graphic parts BZ each other and so as not to be off the pallet graphic Z10, by appropriately moving on the predetermined pallet graphic Z10 (parallel moving and rotational moving). By this graphic location, the location of the respective kinds of the parts 70 with respect to the pallet 10 at the time of actual classification with respect to the pallet 10 is set. When there is the parts graphic BZ incapable of locating on the pallet graphic Z10 of the pallet number Pn of the classification side, this kind of the parts graphic BZ is located (nested) with respect to the pallet graphic Z10 having the pallet number Pn next to the pallet number Pn (for instance, the next to "pallet No.1" is "pallet No.2").

Figure 26:
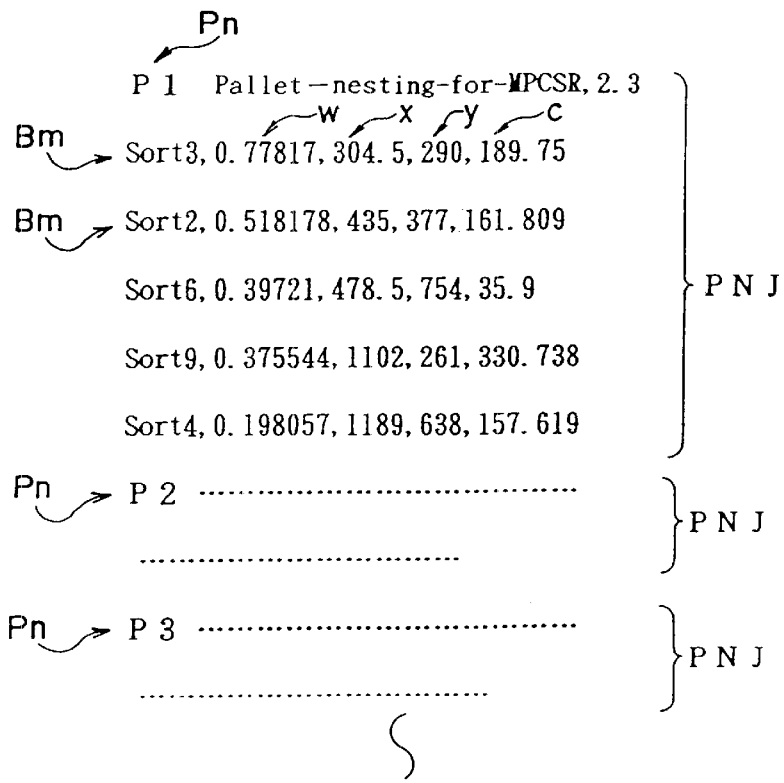
FIG. 26 is a view showing pallet nesting information.

When the parts graphic BZ is located by the graphic location portion 131, there may be the parts graphic BZ (parts graphic BZ of the location impossible parts) impossible to locate as so not to be off in the pallet graphic Z10 since the size of the parts graphic BZ is bigger than one of the pallet graphic Z10. The graphic location portion 131 judges as to whether or not the corresponding parts 70 can be located on the pallet 10 on the basis of the parts graphic BZ and the pallet graphic Z10. The graphic location portion 131 does not locate the parts graphic BZ and stores the parts name Bm of the location impossible parts in the location impossible parts memory 132 (check of the location impossible parts) in case where location is impossible, for instance. After all kinds of the parts graphic BZ in the shape of "sort 3", "sort 2", . . . , is finished locating with respect to the corresponding pallet graphic Z10 in the shape of "pallet No.1", "pallet No. 2", . . . , (or finished checking the location impossible parts), the program enters in the step STP354. And, the pallet nesting setting portion 130 respectively stores and sets the information concerning each pallet graphic Z10 input in the input.display memory 110, that is, the information concerning the pallet graphic Z10 on the pallet coordinates QRZ and the parts graphic BZ located on the pallet graphic Z10, in the pallet nesting information memory 137 as the pallet nesting information PNJ. In the input.display memory 110, each pallet nesting information PNJ is input as the positioning information of each parts graphic BZ in each pallet coordinates QRZ, as shown in FIG. 25. But, the pallet nesting setting portion 130 converts the pallet nesting information PNJ into the positioning information of the robot graphic RZ in each pallet coordinates QRZ so as to serve at the time of thereafter composing classification program when the pallet nesting information PNJ is stored and set in the pallet nesting information memory 137. That is, this conversion can be easily performed since the positioning relation between the parts graphic BZ and the parts coordinates BHZ and the positioning relation between the parts coordinates BHZ and the robot graphic RZ in each parts.robot information BRJ correspond to each other with one to one, as mentioned before. The pallet nesting information PNJ converted in this way is stored and set with the style as shown in FIG. 26, for instance. As shown in FIG. 26, each pallet nesting information PNJ has the pallet number Pn showing corresponding "pallet No.1" "pallet No.2" . . . in the shape of "P1", "P2", "P3". Explanation will now be added with the information concerning "pallet No.1" as shown in FIG. 26 as an instance, "sort 3", "sort 2", "sort 6" . . . is the parts name Bm, and the information concerning the parts 70 of the kind having the corresponding parts name Bm is shown on the line of each parts name Bm. For instance, the value "304.5" (the mark x in FIG. 26) of the second on the right side of "sort 3" shows the x coordinate position on the pallet coordinates QRZ of the robot graphic RZ (C-axis), and the value "290" (the mark y in FIG. 26) right adjacent to the last value shows the y coordinate position on the pallet coordinates QRZ of the robot graphic RZ (C-axis). On this occasion, the values "304.5", "290" showing the x, y coordinate positions are shown in FIG. 25, also, and "G (C)" in FIG. 25 is the position of the gravity G of the parts graphic BZ of the left lower end of the paper ("sort 3") (which may be the center of the C-axis and may not be the gravity position), and shows the position of the C-axis of the robot graphic RZ positioned with respect to the parts graphic BZ, and the gravity G is an origin in the parts coordinates BHZ with respect to the parts graphic BZ. Furthermore, the value right adjacent to the value showing the y coordinate position of the robot graphic RZ on the right side of the parts name Bm, such as "sort 3", "sort 2" . . . of FIG. 26 (the mark C in FIG. 26), for instance, "189.75" in "sort 3" is the rotational angle on the pallet coordinates QRZ of the robot graphic RZ with the C-axis as it's center. As shown in FIGS. 20 and 25, in the state that the parts graphic BZ of "sort 3" is located on the pallet graphic Z10 of the pallet coordinates QRZ, the part coordinates BHZ on the pallet coordinates QRZ is rotated 180 degrees and moved as shown by the two-dot chain line of FIG. 25. Accordingly, the rotational angle on the pallet coordinates QRZ of the robot graphic RZ with respect to the parts graphic BZ of "sort 3" (the mark c in FIG. 26) is the value "189.75" adding 180 to the rotational angle on the parts coordinates BHZ "9.75" (the mark c of FIG. 22). The value "0.77817" right adjacent to "sort 3" of FIG. 26 shows the parts weight Bw of the corresponding parts 70, and the parts weight Bw is taken from the parts.robot information BRJ of the parts.robot information memory 122. By showing the parts weight Bw concerning the respective kinds of the parts 70, the total weight of many, a plurality of kinds of the parts 70 to be classified to each pallet 10 can be obtained (process is omitted), then, on the basis of this total weight, the check is possible so as not to pile the parts 70 exceeding the maximum weight capable of dealing on each pallet 10, and the pallet nesting information PNJ can be reset in case of exceeding the maximum weight capable of dealing.

Figure 27:
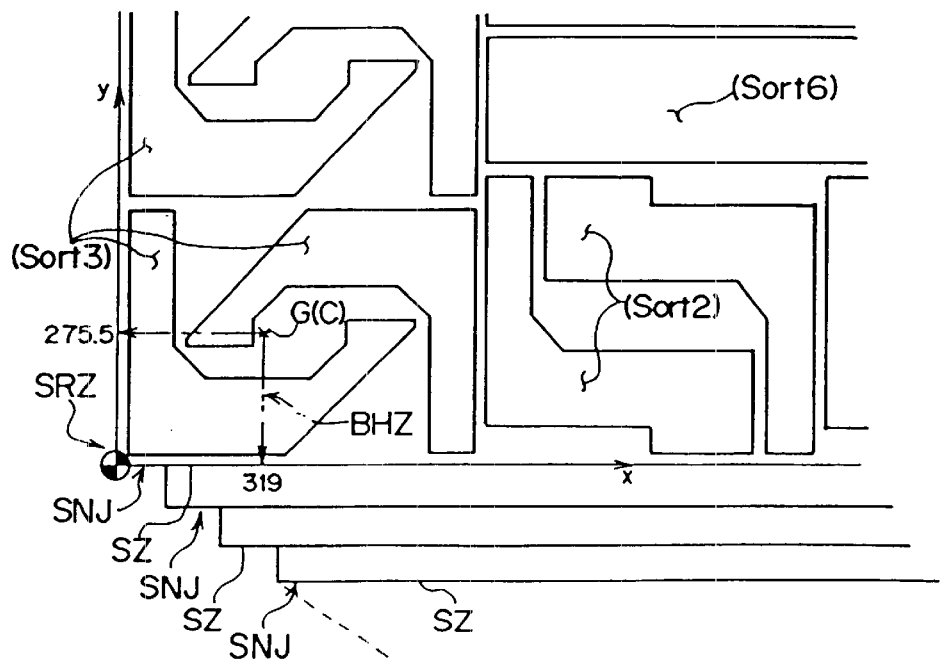
FIG. 27 is a view showing display contents on the display at the time of sheet nesting setting.

After the third sub-program SPR3 is finished, and the step SP3 is finished, the program proceeds with the step SP4 (setting of sheet nesting) so as to have the sheet nesting setting portion 111 set sheet nesting. The sheet nesting setting portion 111 receiving this detects as to how many parts 70 of which parts name Bm is taken out on the sheet workpiece 70A of each sheet number Sn from the nesting schedule file NF (FIG. 23) stored in the nesting schedule memory 109a, and the sheet nesting information SNJ which is the location information of the parts 70 every each sheet workpiece 70A is respectively composed in the input.display memory 110, locating all of the parts graphic BZ to be machined on each sheet graphic SZ (corresponding to the actual sheet workpiece 70A) possessed in advance by the sheet nesting setting portion 111, by reading out the parts graphic BZ including in each parts.robot information BRJ stored in the parts.robot information memory 122, in almost similar way to a well-known sheet nesting setting method, as shown in FIG. 27. For instance, the sheet nesting information SNJ as shown in FIG. 27 is the parts cutting information concerning the sheet workpiece 70A of the sheet number Sn"1", "2", "3", . . . , in order from the front face of the paper. The sheet coordinates SRZ set with respect to the sheet graphic SZ is included in each sheet nesting information SNJ together with the sheet graphic SZ. And, the parts graphic BZ is located with respect to each sheet graphic SZ by locating on the sheet coordinates SRZ with respect to the sheet graphic SZ. For instance, the parts graphic BZ of "sort 3" or "sort 2", which number is one to be taken in the sheet workpiece 70A in fact, is located on the sheet graphic SZ concerning the sheet workpiece 70A of "sheet No. 1" as shown on the front face of the paper of FIG. 27. The parts name Bm of each parts graphic BZ is shown in the shape of (sort3), (sort2) , . . . , for easy understanding in FIG. 27. In a conventional sheet nesting as shown in FIG. 27, the parts cutting information which is the location information of each parts graphic BZ on each sheet coordinates SRZ input in the input.display memory 110 is stored and set as the sheet nesting information as it is. But, in the present embodiment, the sheet nesting setting portion 111 converts each sheet nesting information SNJ in the input.display memory 110 into the positioning information of the robot graphic RZ in each sheet coordinates SRZ so as to store and set in the sheet nesting information memory 111a. By doing so, it's very convenient at the time of composing the classification program later. That is, this conversion can be easily performed, as mentioned above, since the positioning relation between the parts graphic BZ and the parts coordinates BHZ correspond with one to one and the positioning relation between the parts coordinates BHZ and the robot graphic RZ correspond with one to one in each parts.robot information BRJ. The sheet nesting information SNJ converted in this way is stored and set by the style as shown in FIG. 28, for instance. As shown in FIG. 28, each sheet nesting information SNJ has the sheet number Sn showing corresponding "sheet No.1", "sheet No.2", . . . , in the shape of "P1 sample", "P2 sample", "P3 sample". Besides, an explanation is added with the information concerning "sheet No.1" as shown in FIG. 28 as an instance, "sort 3", "sort 3", . . . , "sort 2", . . . , is the parts name Bm, and the information of the sheet nesting concerning the corresponding parts 70 is shown for three lines from the line of this parts name Bm. For instance, as shown in the uppermost portion of the paper of FIG. 28, the value "319" (the mark x in FIG. 28) right adjacent to "sort 3" (corresponds to the parts graphic BZ of the left lower end of the paper in FIG. 27) shows the x coordinate position on the sheet coordinates SRZ of the robot graphic RZ (C-axis), and the value "275.5" (the mark y in FIG. 28) right adjacent to the last value shows the y coordinates position on the sheet coordinates SRZ of the robot graphic RZ (C-axis). The values "319", "275.5" showing the x and y coordinate positions are also shown in FIG. 27, "G (C)" in FIG. 27 is the position of the gravity G of the parts graphic BZ ("sort 3") of the left lower end of the paper, and shows the position of the C-axis of the robot graphic RZ positioned with respect to the parts graphic BZ, and the gravity G is an origin in the parts coordinates BHZ with respect to the parts graphic BZ. Furthermore, the value "189.75" (the mark c in FIG. 28) right adjacent to the value showing the y coordinate position of FIG. 26 is the rotational angle on the sheet coordinates SRZ with the C-axis of the robot graphic RZ as it's center. As shown in FIGS. 20 and 27, in the state that the parts graphic BZ of "sort 3" is located at the ends on the sheet graphic SZ of the sheet coordinates QRZ, the parts coordinates BHZ is rotated 180 degrees and moved on the sheet coordinates SRZ as shown by the two-dot chain line of FIG. 27. Accordingly, the rotational angle (the mark c in FIG. 28) on the sheet coordinates SRZ of the robot graphic RZ with respect to the parts graphic BZ of "sort 3" of the left lower end of the paper of FIG. 27 is the value "189.75" which is added 180 to the rotational angle "9.75" (the mark c of FIG. 22) on the parts coordinates BHZ. On this occasion, a plurality of values for 2 lines from the right of the rotational angle (the mark c of FIG. 28) are the same as the values in the parts.robot information BRJ as shown in FIG. 22, and are the rotational angles of the four arm graphic Z47(1), Z47 (2), Z47(3), Z47(4) in the b-axis direction (the marks b1, b2, b3, b4 in FIG. 28), the positions on the a-axis of the respective absorption head aggregate graphic Z550(1), Z550(2), Z550 (3), Z550(4) (the marks a1, a2, a3, a4 in FIG. 28), and the groups (the marks j1, j2, j3, j4 in FIG. 28) of the pad information PJ in the respective absorption head aggregate graphic Z550(1), Z550(2), Z550(3), Z550(4). Since the rotational angles of the respective arm graphic Z47 in the b-axis direction, the positions of the respective absorption head aggregate graphic Z550 on the a-axis, the group of the pad information PJ in the respective head aggregate graphic Z550 are the values with the robot graphic RZ as its standard (or the values which are not dependent on the coordinate), these values are not changed at the time of converting into the sheet coordinates SRZ from the parts coordinates BHZ. By storing and setting the sheet nesting information SNJ concerning all of the sheet workpiece 70A to be machined in the sheet nesting information memory 111a, the step SP4 as shown in FIG. 17 is finished.

Thereafter, the program proceeds with the step SP5 from the step SP4 so as to have the machining program composing portion 145 compose the machining program. The machining program composing portion 145 receiving this reads out the sheet nesting information SNJ (FIG. 28) every each sheet workpiece 70 stored in the sheet nesting information memory 111a, and reads out the parts.robot information BRJ (FIG. 22) concerning the parts name Bm in the sheet nesting information SNJ from the parts.robot information memory 122 so as to compose the sheet nesting information in the shape of actually locating the parts graphic BZ of the parts 70 to be taken in the sheet graphic SZ of each sheet coordinates SRZ as shown in FIG. 27 (which is comprised of the data showing concrete shape of the parts graphic BZ, not the C-axis center position of the robot graphic RZ). In the present embodiment, the sheet nesting information SNJ is stored in the sheet nesting information memory 111a in the shape of the location of the robot graphic RZ in the sheet coordinates SRZ. But, since the positioning relation between each parts graphic BZ and the robot graphic RZ is determined in the parts.robot information BRJ stored in the parts.robot information memory 122, the sheet nesting information is easily composed in the shape of the location of the parts graphic BZ in the sheet coordinates SRZ, that is, in a similar style as a conventional sheet nesting information, by the sheet nesting information SNJ and the parts.robot information BRJ. Since the sheet nesting information comprised of the data concretely showing the shape of the parts graphic BZ in the sheet coordinates SRZ, which is composed by the machining program composing portion 145 is the same as the sheet nesting information SNJ (FIG. 27) before storing in the sheet nesting information memory 111a (that is, before conversion) in the above-mentioned step SP4, these contents may be used as they are by the machining program composing portion 145 without clearing the information in the input.display memory 110 (the sheet nesting information comprised of the data concretely showing the shape of the parts graphic BZ in the sheet coordinates SRZ) at the time of finishing the procedure 4, as an another method. The machining program composing portion 145 which comprises the sheet nesting information comprised of the data concretely showing the shape of the parts graphic BZ in the sheet coordinates SRZ in this way controls the laser beam machine 3 so as to compose the machining program KPR for executing a predetermined machining on the basis of the sheet nesting information. Detailed explanation is omitted since the composing process or the style of this machining program KPR is similar to the machining program composing process in a prior art. The machining program KPR composed in this way is stored in the machining program memory 145a so as to finish the step SP5 of FIG. 17.

Figure 30:
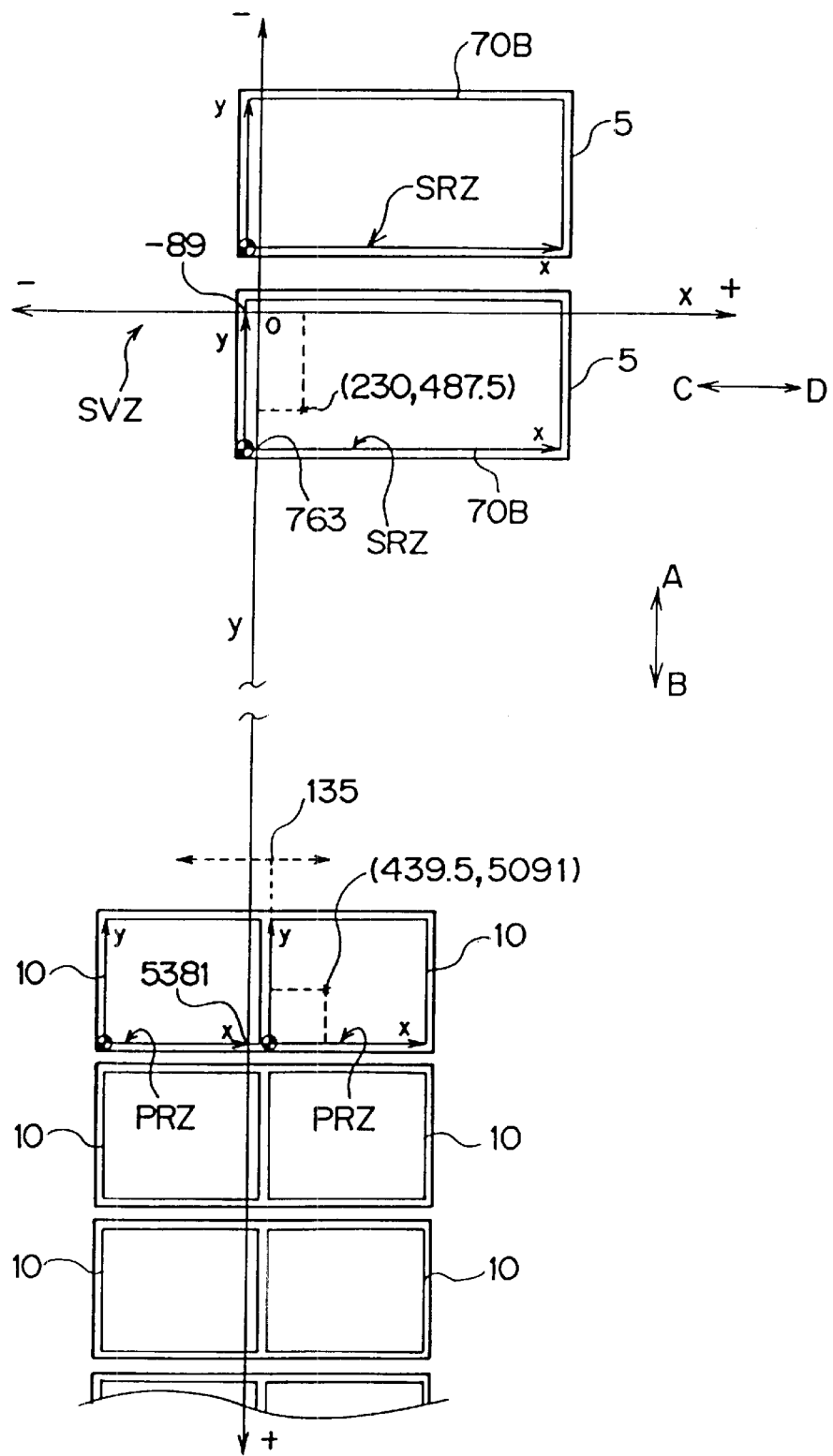
FIG. 30 is a view showing equipment coordinates set with the laser beam machining equipment.

Thereafter, the program proceeds with the step SP6 from the step SP5 so as to have the classification program composing portion 146 compose the classification program SPR. The classification program composing portion 146 receiving this respectively detects the information corresponding to the individual parts 70 from the nesting schedule file NF (FIG. 23) stored in the nesting schedule memory 109a, the pallet nesting information PNJ (FIG. 26) stored in the pallet nesting information memory 137 and the sheet nesting information SNJ (FIG. 28) stored in the sheet nesting information memory 111a so as to compose the classification program SPR for specifying the operations of the palletizing robot 20 on the basis of the detected information. The classification program SPR has the command FRn (n=1, 2, 3, . . . ) concerning the carriage of the individual parts 70 in its carriage order, as shown in FIG. 29. Each command FRn is comprised of "PICn" (n=1, 2, 3, . . . ) which is the part instructing the positioning and absorption of the palletizing robot 20 with respect to the parts 70 in the sheet workpiece 70B located on the classification head 5 and "ULDn" (n=1, 2, 3, . . . ) which is the part instructing the positioning with respect to the pallet 10 when the absorbed parts 70 is carried to the pallet 10 to be classified. Since of these the part of "PICn" is comprised of the positioning of the palletizing robot 20 with respect to the parts 70 machined and located on the basis of the sheet nesting information SNJ in the sheet workpiece 70B, it is comprised of the information having the same contents as ones of the sheet nesting information SNJ. Since of these the part of "ULDn" is comprised of the positioning of the palletizing robot 20 with respect to the pallet 10 when the parts 70 is classified in the pallet 10 on the basis of the pallet nesting information PNJ, it is comprised of the information having the same contents as ones of the pallet nesting information PNJ. But, this classification program SPR is composed with the equipment coordinates SVZ (FIG. 30) provided with the laser beam machining equipment 1 as its standard, and the values recorded on the sheet coordinates SRZ and the pallet coordinates PRZ of the contents of the sheet nesting information SNJ and the pallet nesting information PNJ are converted into the values on the equipment coordinates SVZ. As shown in FIG. 30, the x-axis in this equipment coordinates SVZ is parallel to the direction as shown by the arrows C and D which is the moving direction of the first frame 25 with respect to the suspension frame 21 in the palletizing robot 20 (the direction as shown by the arrow D is the positive direction of the x-axis direction), the y-axis in the equipment coordinates SVZ is parallel to the direction as shown by the arrows A and B which is the travel direction of the palletizing robot 20 along the guide rail 11 (the direction as shown by the arrow B is the positive direction of the y-axis), and the z-axis in the equipment coordinates SVZ which is not shown in FIG. 30 is parallel to the direction as shown by the arrows E and F which is the up and down moving direction of the second frame 29 side of the palletizing robot 20 with respect to the first frame 25 side. The origin O of the equipment coordinates SVZ is set at a predetermined position in the laser beam equipment 1, as shown in FIG. 30. The sheet coordinates SRZ of the sheet workpiece 70B located on the classification head 5 from each laser beam machine 3 is located at a determined position with respect to the classification head 5. So, the sheet coordinates SRZ of the sheet workpiece 70B in this state has the determined positioning relation with respect to the equipment coordinates SVZ. For instance, the sheet coordinates SRZ of the sheet workpiece 70 located on the classification head 5 on the lower side of the paper of FIG. 30 corresponds to the equipment coordinates SVZ in the x-axis direction and is opposite to the equipment coordinates SVZ in the y-axis direction in its positive and negative directions, then the origin of the sheet coordinates SRZ is the coordinate position (−89, 763) on the equipment coordinates SVZ. Each pallet coordinates PRZ in 8 pallets 10 is positioned, having the determined positioning relation with respect to the equipment coordinates SVZ, in the present embodiment. For instance, the pallet coordinates PRZ in the pallet 10 ("pallet No.1") of the right uppermost of the paper of FIG. 30 corresponds with the equipment coordinates SVZ in the x-axis direction, and is opposite to the equipment coordinates SVZ in the y-axis direction in position and negative direction, and the origin of the pallet coordinates PRZ is the coordinate position (5381, 135) on the equipment coordinates SVZ. Accordingly, the x-coordinate value in the equipment coordinates SVZ is "X230.0", adding "−89" to the x coordinate value "319" concerning "sort 3" of the uppermost of the paper in the sheet nesting information SNJ of FIG. 28 in "PIC1" in FIG. 29, for instance. Besides, the y coordinate value "Y487.5" in the equipment coordinates SVZ is obtained by multiplying the y coordinate value "275.5" of FIG. 28 by "−1" and adding "763" to the value. And, the x coordinate value "X439.5" in the equipment coordinates SVZ is obtained by adding "135" to the x coordinate value "304.5" concerning "sort 3" in the pallet nesting information PNJ of FIG. 26, in FIG. 29 in "ULD1". Besides, the y coordinate value "Y5091.0" in the equipment coordinates SVZ is obtained by multiplying the y coordinate value "290" of FIG. 26 by "−1" and adding "5381" to the value. "Z-70.0" is shown in "PICn" of the classification program SPR and "Z-350.0" is shown in "ULDn". This is the z coordinate value for positioning the pad 57 of the palletizing robot 20 in the z-axis direction in the equipment coordinate SVZ (the constant value in the present embodiment, that is, all"Z-70.0" in "PICn" and all"Z-350.0" in "ULDn"). And, the values "W189.75", "G-345.2", "H-348.3", "I-420.6", "J-344.1", "K0.0", "L-15.32", "M-24.0538", "N0.0" in "PICn", "ULDn" are the rotational angle of the suspension frame 35 in the C-axis direction, the positions of the four absorption head aggregates 550(1), 550(2), 550(3) and 550 (4) in the A-axis direction and the rotational angles of the four arms 47(1), 47(2), 47(3) and 47(4) in the B-axis direction in order, and are the same as the values in the pallet nesting information PNJ of FIG. 26 and the sheet nesting information SNJ of FIG. 28 without influence by the conversion into the equipment coordinates SVZ (the values c, a1, a2, a3, a4, b1, b2, b3, b4 of FIGS. 26 and 28). And, the values "P00c00" , "Q00000", "R00c08", "S00000" in "PICn", "ULDn" are the group comprised of the pad information PJ concerning the respective pads 57(1), 57(2) . . . , 57(19) in the four absorption head aggregates 550(1), 550 (2), 550(3), 550(4), and are the same values as the values in the sheet nesting information SNJ of FIG. 28. But, these values are shown by converting the values shown in FIG. 28 (for instance, "0000000000110000000") into hexadecimal number system in FIG. 29. "T0" in the end of"PICn" of the respective commands FRn of FIG. 29 and in the end "ULDn" shows that the parts 70 which is the subject in this command FRn can be absorbed and carried, and can be classified on the pallet 10. For instance, concerning the parts 70 which can not be absorbed and carried, and can not be classified on the pallet 10, such as the parts 70 of the parts name Bm stored in the location impossible parts memory 132 in the above-mentioned setting of the pallet nesting, the value of the end of "PICn" and the end of "ULDn" is "T1" for instance (not shown). In "PICn" or "ULDn" with "T1", the palletizing robot 20 is not driven at the time of execution of the machining.classification program KSP. The classification program SPR composed in this way is stored in the classification program memory 146a, and the step SP6 finishes.

As mentioned above, the pallet nesting information PNJ and the sheet nesting information SNJ are set through the machining.classification program composing unit 101, and then, the classification program SPR is composed in the steps SP3 through SP6 of FIG. 17 in the present embodiment. Especially, the pallet nesting information PNJ is composed by automatic location of graphic by the pallet nesting setting portion 130 and the like, and the operations requiring much time when parts are located on the actual pallet with hands so as to obtain its position information as a conventional way, are not necessary. By doing so, the operation time can be widely shortened and mistakes by hand operations are prevented, so it's very convenient.

Thereafter, the main control portion 102 proceeds with the step SP7 as shown in FIG. 17, and instructs the machining-.classification program organizing portion 147 to organize the machining.classification program KSP. The machining-.classification program organizing portion 147 receiving this composes a series of the machining.classification program KSP to be timely executed by organizing the machining program KPR stored in the machining program memory 145a and the classification program SPR stored in the classification program memory 146a so as to store this in the machining.classification program memory 147a. Then, the step SP7 finishes and all of the procedures in the programming program PRO1 finishes.

The machining and classification of the parts 70 with the laser beam machining equipment 1 by the machining.classification program KSP composed as mentioned above will now be explained. As an preparation, at first, the machining.classification program KSP stored in the machining.classification program memory 147a of the machining.classification program composing unit 101 is output on the laser beam machining equipment control unit 150 side by the communication control portion 113 through the cable 113a, and the machining.classification program KSP is received through the communication control portion 153 connected with the cable 113a in the later beam machining equipment control unit 150 so as to store this in the program memory 152. After this preparation, an operator inputs a machining start command through the keyboard 151 in the laser beam machining equipment control unit 150. The main control portion 149 receiving this command reads out the machining.classification program KSP from the program memory 152 so as to have the program execution portion 154 execute this. The program execution portion 154 reads out the control contents of the respective units 3, 7, 20 in the machining.classification program KSP in order, and the read out control contents are transferred to the respective control portions 155, 156, 157 controlling the respective units 3, 7, 20 so as to execute.

For instance, when the program execution portion 154 reads out the control contents of the carrier robot 7 of the machining.classification program KSP (the contents corresponding to the carrier program which is not shown), this control contents is transferred to the carrier robot control portion 155, the transferred control contents is interpreted by the carrier robot control portion 155 so as to control the carrier robot 7 according to this contents. Besides, for instance, when the program execution portion 154 reads out the control contents of the laser beam machine 3 of the machining.classification program KSP (the contents corresponding to the machining program KPR), this control contents is transferred to the laser beam machine control portion 156, the transferred control contents is interpreted by the laser beam machine control portion 156 so as to control the laser beam machines 3,3 according to this contents. Since the control contents interpreted by the carrier robot control portion 155 and the laser beam machine control portion 156 and the concrete control method according to this control contents are prior art, so the detailed explanation is omitted. That is, the pre-machined sheet workpieces 70A piled and stored are taken out in order in the material stocker 2, and the sheet workpieces 70A taken out are carried to each laser beam machine 3 in order by the carrier robot 7 driven by controlling by the carrier robot control portion 155. Each laser beam machine 3 cuts and machines the sheet workpieces 70A carried in order by controlling by the laser beam machine control portion 156 on the basis of the control contents interpreted by the laser beam machine control portion 156. Since the control contents interpreted by the laser beam machine control portion 156 is based on the machining program KPR and this machining program KPR is based on the sheet nesting information as shown in FIG. 27, a plurality of kinds of the parts 70 are formed on the machined sheet workpiece 70B made by machining the sheet workpiece 70A by each laser beam machine 3 as shown in the contents of FIG. 27. The sheet workpiece 70B machined by each laser beam machine 3 is carried to each classification head 5 in order from each laser beam machine 3 by the carrier robot 7 driven by controlling by the carrier robot control portion 155. On the contrary, each parts 70 formed on the sheet workpiece 70B carried to each classification head 5 is carried on each pallet 10 of each workpiece stocker 9 in order by the procedures described hereinafter in detail through the palletizing robot 20 on the basis of the control contents of the palletizing robot 20 shown in the machining.classification program KSP.

That is, the palletizing robot control portion 157 interprets the control contents transferred from the program execution portion 154 in order. Since this control contents is ones corresponding to the classification program SPR (FIG. 29) organizing the machining.classification program KSP, the contents interpreted by the palletizing robot control portion 157 is regarded as the classification program SPR of FIG. 29. Explanation will be added along the classification program SPR of FIG. 29, hereinafter. That is, the palletizing robot control portion 157 interprets the part of "PIC1" of the command FR1 of FIG. 29. Since "X230.0 Y487.5" has the contents that the rotational axis CT1 (C-axis) of the palletizing robot 20 is positioned on the x and y coordinate positions (230.0, 487.5) on the equipment coordinates SVZ, the palletizing robot control portion 157 drives the motor 22a in the travel driving unit 22 provided with the suspension frame 21 of the palletizing robot 20 through the travel driving unit control portion 159 so as to rotate and drive the gears 22b, 22b. By doing so, the suspension frame 21 is moved and driven in the direction as shown by the arrow A (the y-axis direction in the equipment coordinates SVZ) along the guide rails 11, 11 through the gears 22b, 22b and the racks 11b, 11b engaged with these gears so as to position at a desired position (the position where the y coordinate position on the equipment coordinates SVZ of the rotational axis CT1 is "487.5") by the braking function of the travel driving unit 22.

Subsequently, the palletizing robot control portion 157 drives the motor 26a in the move driving unit 26 provided with the first frame 25 through the move driving unit control portion 160 so as to rotate and drive the gears 26b. By doing so, the first frame 25 is moved and driven with respect to the suspension frame 21 in the direction as shown by the arrow C and D (the x-axis direction in the equipment coordinates SVZ) along the movement rail 23 through the gear 26b and the racks 23a engaged with the gear so as to position at a desired position (the position where the x coordinate position on the equipment coordinates SVZ of the rotational axis CT1 is "230.0") by the braking function of the move driving unit 26.

Furthermore, the palletizing robot control portion 157 interprets "W189.75" in the part of "PIC1" of the command FR1 of FIG. 29 so as to instruct the C-axis drive control portion 162 to rotate and position the suspension frame 35. The C-axis drive control portion 162 receiving this drives the motor 36a in the rotation driving unit 36 between the second frame 29 and the axis 33. By doing so, the pulley 36b is rotated and driven so as to rotate and drive the axis 33 with respect to the second frame 29 in the direction as shown by the arrows R1 and R2 of FIG. 2 (C-axis direction) with the rotational axis CT1 as its center. In this way, the suspension frame 35 side is rotated and driven with respect to the second frame 29 side in the direction as shown by the arrows R1 and R2 of the figure by the rotation of the axis 33. After the suspension frame 35 side is rotated to a desired position (the position rotated 189.75 degrees from the predetermined orient position in the direction as shown by the arrow R2 which is the positive direction with the rotational axis CT1 as its center in the palletizing robot 20), the suspension frame 35 side is stopped and positioned by the braking function of the rotation driving unit 36 side.

Furthermore, the palletizing robot control portion 157 interprets "K0.0", "L-15.32", "M24.05", "N0.0" the part of "PIC1" of the command FR1 of FIG. 29 so as to instruct the B-axis drive control portion 163 to rotate and position the four arms 47. The B-axis drive control portion 163 receiving this drives the driving motor 49 provided with the bracket 46 in each head unit 45, and rotates and drives the arms 47 in the direction as shown by the arrows S and T of FIG. 5 (B-axis direction) with the rotational axis CT2 as its center through the output axis 49*a*. After each arm 47 is rotated to the desired position (the position respectively rotated 0.0 degree, −15.32 degrees, −24.05 degrees, 0.0 degree in the direction as shown by the arrow S which is the B-axis direction from the predetermined orient position with the rotational axis CT2 as its center of the respective arms 47(1), 47(2), 47(3) 47(4) with respect to the suspension frame 35 side), each arm 47 is stopped and positioned by the braking function of each driving motor 49.

Furthermore, the palletizing robot control portion 157 interprets "G-345.2", "H-348.3", I-420.6", "J-344.1" in the part of "PIC1" of the command FR1 of FIG. 29 so as to instruct the A-axis drive control portion 165 to slidably move and position the four absorption head aggregates 550. The A-axis drive control portion 165 receiving this drives the motor 52*a* of the slide driving unit 52 provided with the head frame 51 in each head unit 45 so as to rotate and drives the gear 52*b*. And, the head frame 51 is slidably moved in the direction as shown by the arrows P and Q (A-axis direction) along the slide rails 50, 50 through the rack 47*a* engaged with the gear 52*b*. After the absorption head aggregate 550 loaded on each head frame 51 is slidably moved to the desired position (the position where the respective absorption head aggregates 550(1), 550(2), 550(3), 550(4) respectively move −345.2, −348.3, −420.6, −344.1 in the direction as shown by the arrow Q which is the A-axis direction from the predetermined orient position with respect to the respective arms 47(1), 47(2), 47(3), 47(4)), each absorption head aggregate 550 is stopped and positioned by the braking function of each driving unit 52.

Figure 13:
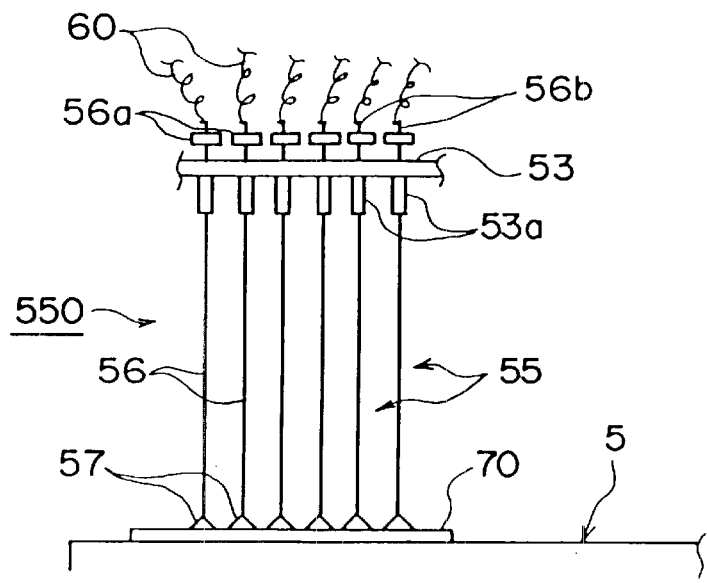
FIG. 13 is side view showing the way of absorbing the parts by the absorption head aggregate.

Besides, the palletizing robot control portion 157 interprets "Z-70.0" in the part of "PIC1" of the command FR1 of FIG. 29, and instructs the nut driving unit control portion 161 to move and position the absorption head aggregate 550 in the up and down direction (the z-axis direction on the equipment coordinates SVZ). The nut driving unit control portion 161 receiving this operates the motor 32*a* in the nut driving unit 32 of the first frame 25 and each nut member 31 is rotated and driven by the motor 32*a* so as to drive each screw member 30 with which each nut member 31 is engaged in the lower hand. By doing so, the second frame 29 side is moved and driven in the lower direction with respect to the first frame 25 side(the direction as shown by the arrow F of the figure and the z-axis direction in the equipment coordinates SVZ , being guided through a plurality of rods 27 and the guide holes 25*a* into which these rods 27 are inserted. The second frame 29 side is further move and driven with respect to the first frame 25 side, that is, four absorption head aggregates 550 are moved in the lower hand, and the nut driving unit 32 is stopped at the position where each pad 57 of these absorption head aggregates 550 abuts on the objective parts 70 in the sheet workpiece 70B on the classification head 5 (that is, the position where the absorption head aggregate 550 is "−70.0" in the z coordinate position in the equipment coordinates SVZ) as shown in FIG. 5 (but, the shape of the parts 70 as shown in FIG. 5 is different from one of the parts 70 corresponding to "PIC1" of FIG. 29, as a matter of explanation convenience) so as to stop moving the second frame 29 side with respect to the first frame 25 side. On this occasion, the second frame 29 side may be continued to be downwardly moved with respect to the first frame 25 side a little bit after each pad 57 of the absorption head aggregate 550 abuts on the parts 70 so as to control the z-axis direction. For instance, when the second frame 29 side is continued to be moved downwardly with respect to the first frame 25 side after each pad 57 abuts on the parts 70, the head support portion 53 supporting a plurality of absorption heads 55 is moved downwardly, as shown in FIG. 13 (the pad protecting member 59 and the like are omitted in FIG. 13). But, each absorption head 55 is free to relatively move on the upper hand with respect to the head support portion 53, slidably moving the tube body 56, then the head support portion 53 is free to relatively move in the lower hand with respect to each absorption head 55. Accordingly, even if a plurality of absorption heads 55 abut on the parts 70 and these absorption heads 55 still remain with respect to the parts 70 in this state, the head support portion 53 side is smoothly moved downwardly without giving these absorption heads 55 an unpremeditated force. Even if the movement quantity of the second frame 29 side with respect to the first frame 25 side is not specially correct, the operation of abutting each pad 57 of the absorption head aggregate 550 on the parts 70 can be correctly safely executed.

Then, four absorption head aggregates 550 are moved and positioned on the equipment coordinates SVZ, that is, are moved and positioned in the level two-dimensional direction and in the up and down direction with respect to the parts 70 on the classification head 5. The positioning relation between the palletizing robot 20 and the parts 70 in the sheet workpiece 70B in this state becomes to be the display contents on the display 105 as shown in FIG. 20. Accordingly, many pads 57 of the absorption head aggregate 550 are in the state of appropriately abutting on the parts 70 as shown in FIG. 20. On the contrary, the palletizing robot control portion 157 interprets "P00c00 Q00000 R00c08 S00000" in the part of "PIC1" of the command FR1 of FIG. 29 and instructs the absorption control portion 166 to absorb by the pad 57. Since this "P00c00 Q00000 R00c08 S00000" is the contents the same as the pad information PJ in the sheet nesting information SNJ of FIG. 28 and the parts.robot information BRJ, the absorption control portion 166 receiving the command opens the valve 65 in the pressure transfer member 62 of the pad 57 which pad information PJ is effective (the pad information PJ in the sheet nesting information SNJ and the parts.robot information BRJ is 1) by driving the valve driving unit 66. On this occasion, the vacuum pump 63 is operated in advance, and all of the valves 65 is closed in the state before operating the valve driving unit 66 (then, all of the valves 65 which are not driven to open by the valve driving unit 66 are closed and the pad 57 corresponding to these valves 65 is "ineffective" as shown in the pad information PJ). Then, the pressure inside each pad 57 connected with the vacuum pump 63 through the pressure transfer member 62, the tube 60 and the tube body 56 is decreased and an absorbing force generates. Since each pad 57 which generates an absorbing force abuts on the objective parts 70 as shown in FIG. 13, the absorbing force generates between the pad 57 and the parts 70 so as to absorb the parts 70. On this occasion, when the parts 70 is absorbed, the pad 57 being out of the parts 70 is "ineffective" in the register of the parts.robot information BRJ. Therefore, vain absorbing force is not given to the pad 57 which can not generate effective absorbing force between the parts 70 and the pad 57, so energy is saved. Such inconveniences that the pad 57 being out of the parts 70 absorbs the part excluding the absorption objective parts 70, such as the parts 70 excluding the objective parts 70 and the part excluding parts of the sheet workpiece 70B or absorbs dust are prevented, so it's very convenient. After the parts 70 is absorbed, the nut driving unit control portion 161 moves and drives the second frame 29 side with respect to the first frame 25 side in the upper direction (the direction as shown by the arrow E of the figure) by the nut driving unit 32 so as to return the absorption head aggregate 550 to an original waiting position and to raise the absorbed parts 70 to a predetermined height. As mentioned before, the above-mentioned parts 70 is certainly safely absorbed and raised since the pad 57 to be effective is determined at the time of register of the parts.robot information BRJ, generating the appropriate absorbing force on the parts weight Bw of this parts 70.

Subsequently, the palletizing robot control portion 157 interprets the part of "ULD1" next to "PIC1" of the command FR1 of FIG. 29. "X439.5 Y5091.0" of "ULD1" has such contents that the rotational axis CT1 (C-axis) of the palletizing robot 20 is positioned on the x and y coordinate positions (439.5, 5091.0) on the equipment coordinates SVZ, the palletizing robot control portion 157 drives the travel driving unit 22 through the travel driving unit control portion 159 so as to move and drive the suspension frame 21 along the guide rails 11, 11 in the direction as shown by the arrow B (the y-axis direction of the equipment coordinates SVZ), then the palletizing robot 20 is positioned and stopped at a desired position (the position where the y coordinate position on the equipment coordinates SVZ of the rotational axis CT1) is "5091.0"). And, the palletizing robot control portion 157 drives the move driving unit 26 through the move driving unit control portion 160 so as to move and drive the first frame 25 side with respect to the suspension frame 21 along the movement rail 23 in the direction as shown by the arrows C and D (the x-axis direction of the equipment coordinates SVZ), then the palletizing robot 20 is moved at a desired position (the position where the x coordinate position on the equipment coordinates SVZ of the rotational axis CT1 is "439.5") so as to stop and position the first frame 25 side. Furthermore, the palletizing robot control portion 157 interprets "W189.75 G-345.2 . . . S00000T0" in the part of "ULD1" of the command FR1. But, since these values are completely the same as ones in "PIC1", rotation.positioning of the suspension frame 35, rotation positioning of the four arms 47, and slide movement.positioning of the four absorption pad aggregates 550 are not executed at this time (then, each moving part of the palletizing robot 20 is still in the state of absorbing the parts 70 on the basis of the command of "PIC1").

Figure 12:
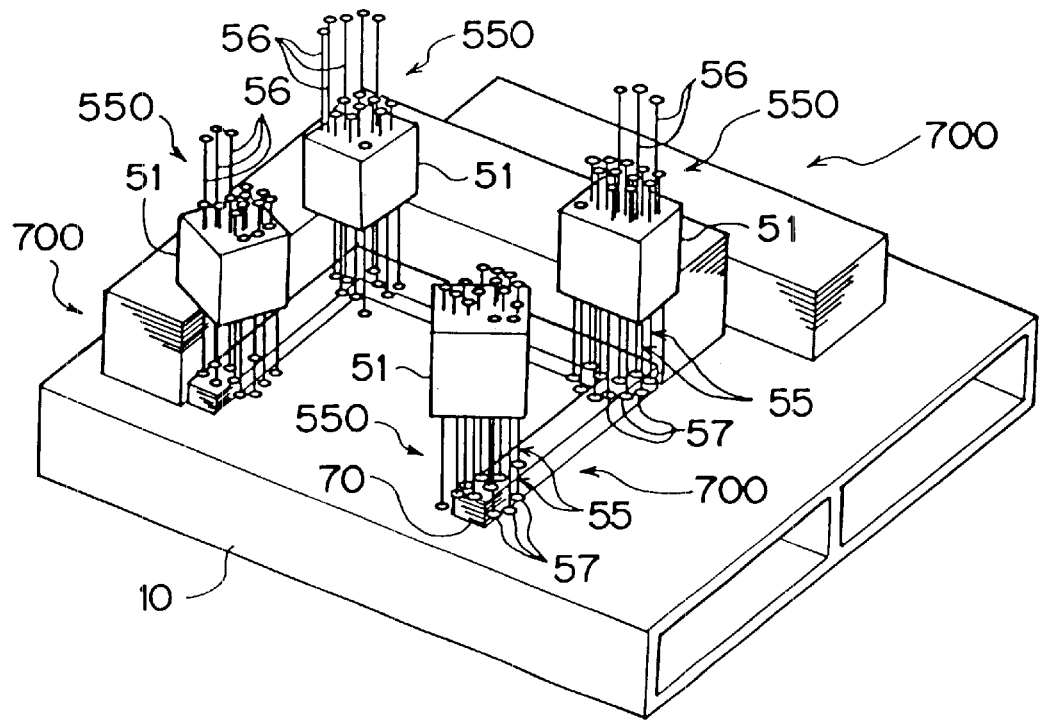
FIG. 12 is a view obliquely seen, showing the way of delivering the carried parts on a pallet.

Subsequently, the palletizing robot control portion 157 interprets "Z-350.0" in the part of "ULD1" of the command FR1, and instructs the nut driving unit control portion 161 to move and position in the z-axis direction. The nut driving unit control portion 161 receiving this drives the nut driving unit 32 so as to move and drive the second frame 29 side in the lower direction with respect to the first frame 25 side (the direction as shown by the arrow F of the figure which is the z-axis direction) and so as to put down the absorbed parts 70 on the objective pallet 10 ("pallet No.1" in this case). Furthermore, the second frame 29 side is moved and driven in the lower direction with respect to the first frame 25 side so as to further put down the absorbed parts 70. And, as shown in FIG. 12 (in FIG. 12, the absorption head aggregate 550 and the head frame 51 simply shown are only shown on the palletizing robot 20 side, for simplification, and the shape of the parts 70 as shown in FIG. 12 is different from one of the parts 70 dealt in "ULD1" as a matter of explanation convenience) or FIG. 14 (in FIG. 14, the pad protecting member 59 and the like are omitted), the parts 70 is loaded at a predetermined position on the pallet 10 (which is on the workpiece pile 700 already piled and loaded in the figure. But, it is on the surface of the pallet 10 since this is the first one in the case of "ULD1") After the loading, the absorption control portion 166 closes all of the valves 65 by the valve driving unit 66 so as to release the absorbing force between each pad 57 and the parts 70 and release the absorption of the parts 70. By doing so, the absorbed and carried parts 70 is delivered, being loaded on the pallet 10. (Thereafter, the second frame 29 side is moved and driven in the upper direction with respect to the first frame 25 side so as to return the absorption head aggregate 550 to the original waiting position.) Since the contents in "ULD1" in the command FR1 instructing the positioning of the palletizing robot 20 with respect to the objective pallet 10 ("pallet No. 1" in this case) is based on the pallet nesting information PNJ as shown in FIG. 25, as mentioned before, the location position in the actual pallet 10 of the parts 70, located by positioning the palletizing robot 20 according to the contents of "ULD1" is similar to the location position of the parts graphic BZ as shown in FIG. 25 with respect to the pallet graphic Z10.

Figure 14:
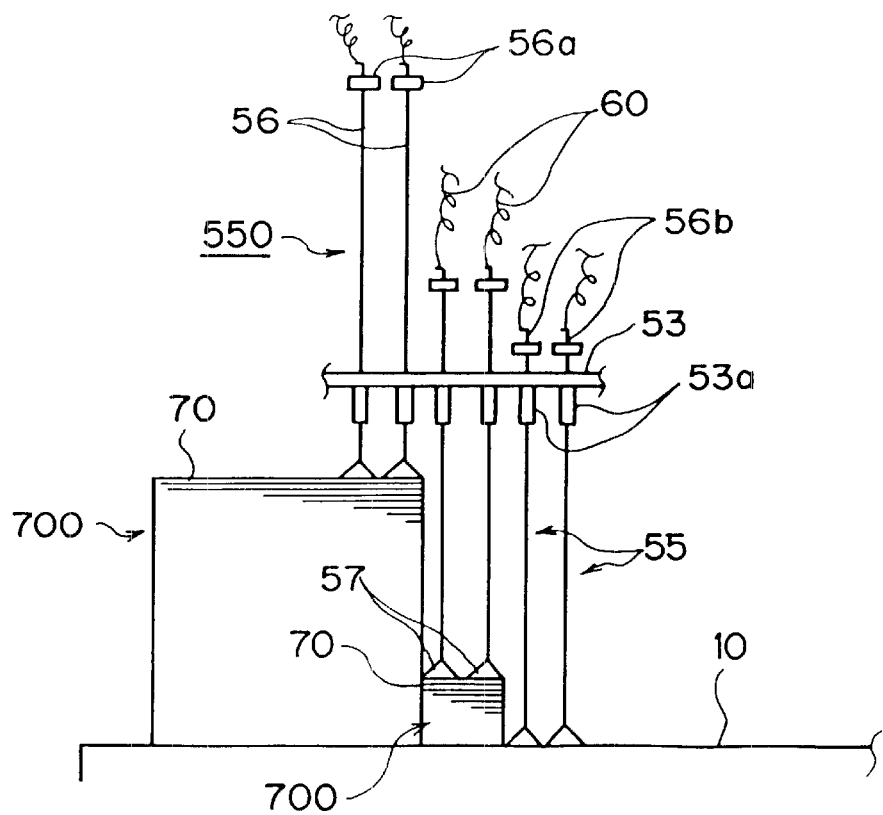
FIG. 14 is a side view, showing the way of delivering the carried parts on a pallet.

In the present embodiment, the z coordinate position when the absorption head aggregate 550 is put down and positioned with respect to the pallet 10 (that is, "Z-350.0" of each"ULDn" in FIG. 29) is constant. When the parts 70 are located on the pallet 10, the same kind of the parts 70 are located, piling up, in an actual case. Therefore, in many cases, the height position where the parts 70 is delivered from the palletizing robot 20 on the pallet 10 side (z coordinate position) (it may be on the surface of the pallet 10 or may be the upper face of the workpiece pile 700 made by piling the parts 70) is different concerning each parts 70. That is, the z coordinate position when the absorption head aggregate 550 is put down and positioned with respect to the pallet 10 is made constant, thereby the absorption head aggregate 550 may continue to be moved and driven downwardly after the parts 70 absorbed and carried is loaded on the pallet 10 side. In such a case, the head supporting portion 53 supporting a plurality of the absorption heads 55 is further put down, as shown in FIG. 14 (the absorption heads 55 absorbing the parts 70 are two in the center of the paper in figure). But, since the head support portion 53 is free to relatively move in the lower direction with respect to each absorption head 55 as mentioned before, the head support portion 53 can put down without be prevented by these absorption heads 55 even in the state that each absorption head 55 abuts on the parts 70 so as to stop without further moving in the lower direction, then an unpremeditated power is not given to the absorption head 55 by the head support portion 53. That is, even if the movement quantity of the absorption head aggregate 550 in the z-axis direction is not set for an individual parts 70, the loading and deliver of the absorbed parts 70 can be appropriately executed, so it's very convenient without complexity in the programming.

When the parts 70 is loaded and delivered, the carried parts 70 are loaded and delivered, making the workpiece pile 700 beside the workpiece pile 700 already existent as shown in FIGS. 12 and 14, for instance, since it is necessary to classify many parts 70, effectively using the limited space on the pallet 10, similar to the display contents as shown in FIG. 25. In this instance, another workpiece pile 700 already existent exists just under the absorption head 55 which does not absorb the parts 70 (two absorption heads 55 on the left side of the paper in FIG. 14), being higher than the loading position on which the absorbing parts 70 is loaded (height level). Accordingly, when the absorbing parts 70 is put down, the absorption head 55 which does not absorb the parts 70 (two absorption heads 55 on the left side of the paper in FIG. 14) firstly abuts on the upper face of the another workpiece pile 700. But, if the parts 70 continues to be put down as it is, only absorption head 55 abutting on the workpiece pile 700 remains in the abutting state, and slidably moves on the upper hand relative to the head support portion 53. This is because each absorption head 55 is free to individually move in the up and down direction relative to the head support portion 53 in one absorption head aggregate 550. Accordingly, the absorption head 55 abutting on the workpiece pile 700 does not prevent the head support portion 53 side from putting down. On the contrary, these absorption heads 55 do not receive an inadvertent force from the head support portion 53 side. And, the absorption heads 55 absorbing the parts 70 are put down without any hindrance so as to load and deliver the parts 70 on a predetermined loading position. The parts 70 can be appropriately delivered at such a small place.

The pad protecting member 59 in each absorption head 55 has a function of preventing from inadvertently absorbing outside dust when suction force generates in the pad 57, in addition to preventing from damaging by colliding a plurality of pads 57 with one another in the absorption head aggregate 550. After the positions of respective absorption heads 55 are shifted in the up and down direction in the absorption head aggregate 550 as shown in FIG. 14, the absorption heads 55 which moves in the upper direction with respect to the head support portion 53 by raising the head support portion 53 side descend by the dead weight (may be compulsorily brought down by using a screw or the like) so as to match all of the absorption heads 55 to the same height as shown in FIG. 6. On this occasion, the pad protecting member 59 of a plurality of pads 57 adjacent to one another has the taper portion 59a on its upper side. Therefore, when the pad protecting members 59, 59 adjacent to each other are shifted in up and down direction and are returned to the same height again, the lower end side of the pad protecting member 59 going down from the upper hand abuts on the taper portion 59a of the adjacent pad protecting member 59 which is in the lower hand, then the pad protecting member 59 slips down along this taper shape. Then, catching the pad protecting members 59, 59 each other can be prevented, so it is convenient.

Subsequently, the palletizing robot control portion 157 interprets the command FR2 of FIG. 29, and moves and positions the palletizing robot 20 to the classification head 5 on which the parts 70 to be carried next is loaded in the direction as shown by the arrow A (the y-axis direction) on the basis of the contents and the values of "PIC2", and moves and position the first frame 25 in the direction as shown by the arrows C and D (the x-axis direction) with respect to the suspension frame 21 so as to locate the rotational axis CT1 of the palletizing robot 20 (C-axis) on the predetermined x and y coordinate positions in as shown in "PIC2" of the command FR of FIG. 29, rotates and positions the suspension frame 35 in the C-axis direction a predetermined rotational angle as shown in "PIC2" of FIG. 29, rotates and positions each arm 47 in the B-axis direction a predetermined angle as shown in "PIC2" of FIG. 29, slidably moves and positions each absorption head aggregate 550 to the position as shown in "PIC2" of FIG. 29 in the A-axis direction and put down and position the absorption head aggregate 550 to the z coordinate position as shown in "PIC2" of FIG. 29. By doing so, four absorption head aggregates 550 are positioned so as to fit the objective parts 70 in the sheet workpiece 70B on the classification head 5. In such a state that a plurality of pads 57 abut on the objective parts 70, the parts 70 is absorbed by the pad 57 which is "effective" by driving the valve driving unit 66 on the basis of the contents as shown in "PIC2" and opening the predetermined valve 65. Subsequently, after the second frame 29 side is raised with respect to the first frame 25, the palletizing robot control portion 157 moves and positions the palletizing robot 20 to the pallet 10 to be classified next in the direction as shown by the arrow B(y-axis direction) on the basis of the contents and the values of "ULD2" of the command FR2 of FIG. 29, and moves and positions the first frame 25 in the direction as shown by the arrows C and D (x-axis direction) with respect to the suspension frame 21 so as to locate the rotational axis CT1 of the palletizing robot 20 (C-axis) on the predetermined coordinate position as shown in "ULD2" of the command FR of FIG. 29. In case of the command FR2, "PIC2" and "ULD2" are different from each other in the rotational angle in the C-axis direction "W . . . ". This is because the direction of the parts 70 on the classification head 5 and the direction of the parts 70 on the pallet 10 are different from each other on the equipment coordinates SVZ (different 180 degrees in case of the command FR2). Accordingly, in case of this command FR2, the direction of the parts 70 is adjusted by rotating and positioning the suspension frame 35 to the predetermined rotational angle position as shown in "ULD2" of FIG. 29 in the C-axis direction (the angular position rotating "W . . . " from the predetermined orient position). And, the absorption head aggregate 550 is put down to the predetermined z coordinate position as shown in "ULD2" of FIG. 29 so as to load the absorbing parts 70 on the loading position and so as to release the absorption by the pad 57. Then, the deliver finishes.

Thereafter, the palletizing robot control portion 157 repeats a series of operations in a similar routines mentioned before by the interpretation of the commands FR3, FR4, FR5, . . . of FIG. 29 and the commands based on this interpretation. That is, the rotational axis CT1 of the palletizing robot 20 (C-axis) is positioned at the desired x and y coordinate position of the classification head 5 side, the suspension frame 35 is rotated and positioned in the C-axis direction a desired rotational angle, each arm 47 is rotated and positioned in the B-axis direction a desired rotational angle, each absorption head aggregate 550 is slidably moved and positioned to a desired position in the A-axis direction, and the absorption head aggregate 550 is put down and positioned a predetermined movement quantity so as to position the four absorption head aggregates 550, fitting to the objective parts 70 in the sheet workpiece 70B on the classification head 5. Furthermore, the valve driving unit 66 is driven and the predetermined valve 65 is opened so as to absorb the parts 70 by the "effective" pad 57, the second frame 29 side is raised with respect to the first frame 25. Thereafter, the rotational axis CT1 of the palletizing robot 20 (C-axis) is positioned to the desired x and y coordinate position of the pallet 10 side to be classified next, the suspension frame 35 is rotated and positioned a desired rotational angle in the C-axis direction, and the absorption head aggregate 550 is put down and positioned to the predetermined z coordinate position so as to deliver the carried and absorbed parts 70 to the pallet 10 to be classified. By doing so, each parts 70 of the sheet workpiece 70B loaded on each classification head 5 in order is absorbed and carried in order so as to deliver on a predetermined pallet 10 in each workpiece stocker 9 and classify. Since this series of operations are executed according to the machining.classification program KSP composed on the basis of the above-mentioned nesting schedule file NF, each parts 70 of each sheet workpiece 70B is carried to a predetermined pallet 10 in order and is classified.

As mentioned before, in the palletizing robot 20 of the present embodiment, a plurality of absorption head aggregates 550 is provided, free to respectively move and position in the horizontal two-dimensional direction by the rotation and positioning of the suspension frame 35 in the C-axis direction, the rotation and positioning of the four arm 47 in the B-axis direction and slidably movement and positioning of the four absorption head aggregates 550 in the A-axis direction. Therefore, each absorption head aggregate 550 can be appropriately positioned with respect to the workpiece having a complex shape, then, the workpiece can be absorbed and carried with no problem. Besides, each absorption head aggregate 550 is comprised of a plurality of absorption heads 55 which pads 57 are provided adjacent to each other. Then, suction force individually generates in the pads 57 of each absorption head 55. Then, even if some pads 57 of the absorption head aggregate 550 are out of the workpiece, the workpiece can be appropriately absorbed by the remainder pads 57. Then, the fine complex workpiece having the width smaller than the absorption head aggregate 550, for instance, can be also absorbed, so it is very convenient. In the above-mentioned embodiment, only one parts 70 is absorbed and carried at one time of absorption and carriage. But, in case where the absorption and carriage of one parts 70 can be executed through three or less absorption head aggregates 550, another parts 70 is absorbed through the remaining absorption head aggregates 550 so as to absorb and carry a plurality of parts 70 at one time of absorption and carriage. By doing so, the frequency of going and returning between the classification head 5 and the pallet 10 by the palletizing robot 20 can be reduced and classification operation time can be widely shortened.

In the above-mentioned embodiment, the tube body 56 and the pad 57 are fixedly connected in the absorption head 55. But, as another example, the tube body 56 and the pad 57 may be connected with an universal joint (not shown) or the like so as to rotate the pad 57 in all direction with respect to the tube body 56 (for instance, in the direction as shown by the arrow M1, M2, M3 or M4 shown in the right edge of the paper of FIG. 11). By doing so, even if the workpiece is one having an irregular portion by pressing machining or the like (not shown), the pads 57 are adjusted to the surface having the irregular portion by appropriately rotating each pad 57. Then, effective suction force can be generated between the pad 57 and the workpiece. So, the absorption and carry of the workpiece having an irregular portion can be performed.

In the above-mentioned embodiment, the absorption set aggregate 550 is free to move and position in a horizontal two-dimensional direction through the horizontal direction moving structure, which is comprised of the axis 33, the suspension frame 35, the rotation driving unit 36, the arm 47, the driving motor 49, the head frame 51, the slide driving unit 52 and the like. But, the horizontal direction moving structure may have another various structure. For instance, the arm having a flexible joint at a plurality of parts can be provided with the second frame 29 or the like so as to put the absorption head aggregate 550 on the top end side of this arm.

Besides, in the above-mentioned embodiment, the tube body 56 in the absorption head 55 is the member connecting and supporting the pad 57, being free to move in the up and down direction with respect to the head support portion 53, and is the absorbing means for transferring reduction of pressure from the vacuum pump 63 side to the pads 57. But, as another example, the slide member in the shape of a bar, which does not serve an absorbing means may be adopted in place of the tube body 56, and the absorbing means which is comprised of a tube or the like, connected with the vacuum pump 63 side, may be directly connected with the pad 57 connected with the slide member.

The present invention is explained on the basis of the embodiments heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A parts classification unit for absorbing parts made by cutting and machining a sheet workpiece through absorbing means and carrying from a first position to a second position and classifying, said parts classification unit comprising:

a shape information storing portion for storing parts shape information of the parts to be classified and absorbing means shape information of said absorbing means;

an image display portion for displaying said parts and said absorbing means on the basis of said parts shape information and said absorbing means shape information stored in said shape information storing portion;

an absorbing position instructing means, capable of instructing absorbing position of said absorbing means with respect to the parts displayed on said image display portion, operable by an operator;

an absorbing means position computing portion for computing the absorbing position of said absorbing means with respect to said parts, instructed by said absorbing position instructing means, as absorbing means position information;

an absorbing means position information storing portion for storing the absorbing means position information computed by said absorbing means position computing portion;

a parts location information storing portion for storing location information in said first position with respect to said parts;

a classification information storing portion for storing classification information in said second position with respect to said parts; and a program composing portion for composing and outputting an absorption carriage program with respect to said parts in such a manner that moving.positioning instruction of said absorbing means from said first position to said second position is composed on the basis of said absorbing means position information stored in said absorbing means position information storing portion, said location information stored in said parts location information storing portion and said classification information stored in said classification information storing portion.

2. The parts classification unit as set forth in claim 1 wherein a standard position is provided with said absorbing means, and said image display portion displays said parts and said absorbing means, corresponding a gravity position of said parts and said standard position of said absorbing means with each other.

3. The parts classification unit as set forth in claim 1 wherein said image display portion displays said parts and said absorbing means on two-dimensional coordinates corresponding to a level movement direction of said absorbing means.

4. The parts classification unit as set forth in claim 1 wherein an absorbing force detecting portion for detecting absorbing force by said absorbing means is provided, and an absorbing force judgement output portion for judging and outputting excess or deficiency of absorbing force by said absorbing means on the basis of the absorbing force detected by said absorbing force detecting portion and the weight of parts to be classified is provided.

5. The parts classification unit as set forth in claim 4 wherein said absorbing means has an absorption head aggregate comprised of a plurality of absorption heads, an absorption head position relation judgement portion for judging the position relation of each of said absorption heads of said absorbing means with respect to said parts displayed on said image display portion is provided, and said absorbing force detecting portion detects the absorbing force by said absorbing means on the basis of the judgement result concerning said each absorption head by said absorption head position relation judgement portion.

6. The parts classification unit as set forth in claim 1 wherein said absorbing means has an absorption head aggregate comprised of a plurality of absorption heads, an absorption head position relation judgement portion for judging the position relation of each of said absorption heads of said absorbing means with respect to said parts displayed on said image display portion is provided, and said program composing portion composes and outputs said absorption carriage program, composing a control command concerning said each absorption head of said absorbing means on the basis of the judgement result concerning said each absorption head by said absorption head position relation judgement portion.

7. The parts classification unit as set forth in claim 1 wherein a location information computing portion for computing location information of said parts in said first position on the basis of the absorbing position of said absorbing means with respect to said parts computed by said absorbing position computing portion as the positioning information of said absorbing means in said first position is provided.

8. The parts classification unit as set forth in claim 1 wherein a classification information computing portion for computing classification information of said parts in said second position on the basis of the absorbing position of said absorbing means with respect to said parts computed by said absorbing position computing portion as the positioning information of said absorbing means in said second position is provided.

9. A parts classification unit for absorbing parts made by cutting and machining a sheet workpiece and carrying from a first position to a second position through absorbing carriage means and classifying, said parts classification unit comprising:

an absorbing position information storing portion for storing absorbing position information concerning the absorbing position of said absorption carriage means with respect to a plurality of parts groups, said parts group being comprised of one or more parts in the same shape to be classified;

a parts location information storing portion for storing location information at said first position concerning individual parts belonging to said plurality of parts groups;

a shape information storing portion for storing parts shape information of said parts to be classified and area shape information of parts classification area in said second position;

a parts classification position computing portion for computing and composing parts classification position information by computing classification position of said each parts group with respect to said parts classification area on the basis of said parts shape information and said area shape information stored in said shape information storing portion;

a parts classification position information storing portion for storing the parts classification position information computed by said parts classification position computing portion;

a parts corresponding information detecting portion for detecting absorbing position information, location information and parts classification position information corresponding to said parts concerning individual parts in said each parts group from the absorbing position information stored in said absorbing position information storing portion, the location information stored in said parts location information storing portion and the parts classification position information stored in said parts classification position information storing portion; and a program composing portion for composing and outputting a classification program with respect to said individual parts, composing moving.positioning command of said absorption carriage means from said first position to said second position on the basis of the detecting result by said parts corresponding information detecting portion for said individual parts.

10. The parts classification unit as set forth in claim 9 wherein a parts cutting information storing portion for storing parts cutting information with respect to a sheet workpiece for individual parts belonging to said plurality of parts groups is provided, and a parts location information computing portion for computing location information concerning said individual parts in said first position on the basis of the parts cutting information stored in said parts cutting information storing portion and the absorbing position information stored in said absorbing position information storing portion as positioning information with respect to said first position of said absorption carriage means is provided.

11. The parts classification unit as set forth in claim 9 wherein said part classification position computing portion computes and composes parts classification position information by computing the classification position of said each parts group with respect to said parts classification area on the basis of said parts shape information and said area shape information stored in said shape information storing portion and the absorbing position information stored in said absorbing position information storing portion as the positioning information of said absorption carriage means with respect to said parts classification area.

12. The parts classification unit as set forth in claim 9 wherein a parts cutting information storing portion for storing parts cutting information with respect to a sheet workpiece for individual parts belonging to said plurality of parts groups is provided, and a parts location information computing portion for computing location information concerning said individual parts in said first position on the basis of the parts cutting information stored in said parts cutting information storing portion and the absorbing position information stored in said absorbing position information storing portion as positioning information of said absorbing carriage means with respect to said first position is provided, said part classification position computing portion computes and composes parts classification position information by computing the classification position of said each parts group with respect to said parts classification area on the basis of said parts shape information and said area shape information stored in said shape information storing portion and the absorbing position information stored in said absorbing position information storing portion as the positioning information of said absorbing carriage means with respect to said parts classification area, and said program composing portion composes moving.positioning instruction of said absorbing carriage means from said first position to said second position for said individual parts from the location information which is the positioning information of said absorbing carriage means with respect to said first position and the parts classification positioning information which is the positioning information of said absorbing carriage means with respect to said parts classification area, corresponding to said individual parts.

13. The parts classification unit as set forth in claim 9 wherein a part location judging portion for judging and outputting possibility or impossibility of location with respect to said parts classification area for said parts to be classified on the basis of said parts shape information and said area shape information stored in said shape information storing portion is provided.

14. The parts classification unit as set forth in claim 9 wherein a plate thickness information storing portion for storing plate thickness information of said parts to be classified is provided, and a piling height computing portion for computing and outputting piling height of parts of said each parts group from the plate thickness information stored in said plate thickness information storing portion and the number of the parts to be classified belonging to said each parts group is provided.

15. The parts classification unit as set forth in claim 14 wherein a piling possibility judging portion for judging and outputting the possibility of piling parts concerning said each parts group in said parts classification area on the basis of the piling height computed by said piling height computing portion is provided.

16. The parts classification unit as set forth in claim 9 wherein said absorbing carriage means has a frame with which a rotational center is provided, being free to move and position in a level direction between said first position and said second position, an absorption head capable of absorbing parts is provided with said frame, being free to move and position, and said program composing portion composes a moving.positioning command of said absorbing carriage means, being comprised of a moving.positioning command in a level direction of said frame and a rotationally moving.positioning command with said rotational center of said frame as its center.

17. A parts classification unit for absorbing parts made by cutting and machining a sheet workpiece through absorbing carriage means and carrying from a first position to a second position and classifying, said parts classification unit comprising:
  a shape information storing portion for storing parts shape information of a parts group comprised of one or more parts to be classified in the same shape;
  a parts number storing portion for storing the number of parts belonging to said parts group concerning said each parts group;
  an image display portion for displaying the parts belonging to said each parts group on the basis of said parts shape information stored in said shape information storing portion;
  an absorbing position instructing means, capable of instructing absorbing position of said absorbing carriage means with respect to parts displayed on said image display portion, belonging to said each parts group, operable by an operator;
  an absorbing position computing portion for computing the absorbing position of said absorbing carriage means with respect to said parts belonging to said each parts group, instructed by said absorbing position instructing means, as absorbing position information;
  an absorbing position information storing portion for storing the absorbing position information computed by said absorbing position computing portion;
  a parts location information computing portion for computing location information in said first position concerning the individual parts on the basis of said parts shape information stored in said shape information storing portion and the number of the parts stored in said parts number storing portion;
  a parts location information storing portion for storing the parts location information computed by said parts location information computing portion;
  a positioning information computing portion for computing positioning information in said first position of said absorbing carriage means with respect to said individual parts belonging to said each parts group on the basis of the absorbing position information stored by said absorbing position information storing portion and the location information stored in said parts location information storing portion; and
  a program composing portion for composing and outputting a classification program with respect to said individual parts in such a manner that moving.positioning command of said absorbing carriage means from said first position to said second position is composed for said individual parts on the basis of said positioning information computed by said positioning information computing portion.

18. The parts classification unit as set forth in claim 17 wherein said parts location information computing portion computes the location information in said first position concerning said individual parts as the positioning information of said absorbing carriage means with respect to said first position on the basis of the absorbing position information concerning the parts belonging to each parts group stored by said absorbing position information storing portion, said parts shape information of each parts group stored in said shape information storing portion, said parts number of the parts belonging to each parts group stored in said parts number storing portion.

19. The parts classification unit as set forth in claim 17 wherein said absorbing carriage means has a frame with which rotational center is provided, being free to move and position in a level direction between said first position and said second position, an absorption head capable of absorbing parts is provided with said frame, being free to move and position, and said program composing portion composes a moving.positioning command of said absorbing carriage means from said first position to said second position in such a manner that only the movement quantity in a level direction of said frame and/or the rotational movement quantity with said rotational center of said frame as its center are different between these parts concerning said parts belonging to said same parts group and said parts having different shape are not overlapped each other in said second position in absorbing, carrying and classifying concerning said parts having different shape.

20. The parts classification unit as set forth in claim 17 wherein said first position is a classification head to be used in a laser beam machining equipment, for locating a sheet workpiece machined by laser beam cutting, and the second position is a pallet for classifying parts to be used in said laser beam machining equipment.

* * * * *